(12) United States Patent
Ksairi et al.

(10) Patent No.: US 11,736,161 B2
(45) Date of Patent: Aug. 22, 2023

(54) ADAPTIVE KRONECKER PRODUCT MIMO PRECODING FOR A MULTI-ANTENNA NETWORK ENTITY AND A WIRELESS COMMUNICATION DEVICE AND CORRESPONDING METHODS

(71) Applicant: Huawei Technologies Co., Ltd., Shenzhen (CN)

(72) Inventors: Nassar Ksairi, Boulogne Billancourt (FR); Marios Kountouris, Boulogne Billancourt (FR)

(73) Assignee: Huawei Technologies Co., Ltd., Shenzhen (CN)

( * ) Notice: Subject to any disclaimer, the term of this patent is extended or adjusted under 35 U.S.C. 154(b) by 0 days.

(21) Appl. No.: 17/649,428

(22) Filed: Jan. 31, 2022

(65) Prior Publication Data

US 2022/0200673 A1 Jun. 23, 2022

Related U.S. Application Data

(63) Continuation of application No. PCT/EP2019/070792, filed on Aug. 1, 2019.

(51) Int. Cl.
*H04B 7/0456* (2017.01)
*H04B 7/0417* (2017.01)

(52) U.S. Cl.
CPC ........ *H04B 7/0473* (2013.01); *H04B 7/0421* (2013.01); *H04B 7/0482* (2013.01)

(58) Field of Classification Search
CPC .. H04B 7/0473; H04B 7/0421; H04B 7/0482; H04B 7/0626; H04B 7/063; H04B 7/0639; H04B 7/0478; H04B 7/0658
See application file for complete search history.

(56) References Cited

U.S. PATENT DOCUMENTS 8,761,289 B2 6/2014 Erell et al.
9,667,328 B2 5/2017 Xin et al.
(Continued)

FOREIGN PATENT DOCUMENTS

CN 106797242 A 5/2017
CN 107733493 A 2/2018
(Continued)

OTHER PUBLICATIONS

Alkhateeb, A. et al., "Multi-Layer Precoding for Full-Dimensional Massive MIMO Systems", 48th Asilomar Conference on Signals, Systems and Computers, Pacific Grove, CA, US, Nov. 2-5, 2014, 5 pages.
(Continued)

*Primary Examiner* — Siu M Lee
(74) *Attorney, Agent, or Firm* — Slater Matsil, LLP

(57) ABSTRACT

A network entity comprises a plurality of antenna elements arranged in one or more two dimensional (2D) arrays having one or more columns and rows. The network entity configured to determine at least one set of one or more precoding vectors related to the plurality of antenna elements, wherein each set of precoding vectors is associated with a different Kronecker product tradeoff parameter $L \geq 1$; and transmit, at least one set of a plurality of Cell Specific Reference Signals
(Continued)

(CRS) to be used to estimate channel state information (CSI) based on the at least one set of precoding vectors and/or at least one Kronecker product tradeoff parameter L.

19 Claims, 16 Drawing Sheets

(56) References Cited

U.S. PATENT DOCUMENTS

| | | | |
|---|---|---|---|
| 10,205,499 B2 | 2/2019 | Harrison et al. | |
| 10,693,537 B2 * | 6/2020 | Li | H04W 28/02 |
| 10,727,916 B2 * | 7/2020 | Liu | H04B 7/0626 |
| 10,790,890 B2 * | 9/2020 | Chen | H04L 5/0048 |
| 2011/0268100 A1 | 11/2011 | Gorokhov et al. | |
| 2013/0259151 A1 | 10/2013 | Thomas et al. | |
| 2015/0341101 A1 | 11/2015 | Park et al. | |
| 2015/0358060 A1 | 12/2015 | Jonghyun et al. | |
| 2016/0028519 A1 | 1/2016 | Wei | |
| 2016/0218782 A1 | 7/2016 | Jannis et al. | |
| 2016/0380734 A1 | 12/2016 | Jianguo et al. | |
| 2017/0019159 A1 | 1/2017 | Vook et al. | |
| 2017/0250743 A1 * | 8/2017 | Jöngren | H04B 7/0478 |
| 2017/0310374 A1 | 10/2017 | Kim et al. | |
| 2018/0198499 A1 * | 7/2018 | Park | H04B 7/04 |
| 2019/0260429 A1 * | 8/2019 | Xu | H04B 7/06 |

FOREIGN PATENT DOCUMENTS

| | | |
|---|---|---|
| CN | 107925451 A | 4/2018 |
| CN | 107925466 A | 4/2018 |
| WO | 2016114708 A2 | 7/2016 |

OTHER PUBLICATIONS

Chen, R. et al., "Multiuser Space-Time Block Coded MIMO System with Downlink Precoding", IEEE Communications Society, Paris, France, Jun. 2004, 5 pages.

Cheng, M. et al., "Beamforming and Alamouti STBC Combined Downlink Transmission Schemes in Communication Systems for High-Speed Railway", 2013 International Conference on Wireless Communications and Signal Processing (WCSP), Hangzhou, China, Oct. 24-26, 2013, 6 pages.

Han, Y. et al., "Design of double codebook based on 3D dual-polarized channel for multiuser MIMO system", EURASIP Journal on Advances in Signal Processing, Jul. 12, 2014, 13 pages.

Jöngren, G., "Combining Beamforming and Orthogonal Space-Time Block Coding", IEEE Transactions on Information Theory, vol. 48, No. 3, Mar. 2002, 17 pages.

Catt., "On the need of extended CSI-RS with more than 8 ports", 3GPP TSG RAN WG1 Meeting #80bis, R1-15-1370, Belgrade, Serbia, Apr. 20-24, 2015, 8 pages.

Samsung et al., "WF on Type I and II CSI codebooks", 3GPP TSG-RAN WG1 #89, R1-1709232, Hangzhou, China, May 15-29, 2017, 24 pages.

Song, Y. et al., "CSI-RS Design for 3D MIMO in Future LTE-Advanced", 2014 IEEE International Conference on Communications (ICC)—Wireless Communications Symposium, Jun. 10-14, 2014, 6 pages.

Ying. D. et al., "Kronecker Product Correlation Model and Limited Feedback Codebook Design in a 3D Channel Model", 2014 IEEE International Conference on Communications (ICC)—Wireless Communications Symposium, Jun. 10-14, 2014, 6 pages.

* cited by examiner

ADAPTIVE KRONECKER PRODUCT MIMO PRECODING FOR A MULTI-ANTENNA NETWORK ENTITY AND A WIRELESS COMMUNICATION DEVICE AND CORRESPONDING METHODS

CROSS-REFERENCE TO RELATED APPLICATIONS

This application is a continuation of International Application No. PCT/EP2019/070792, filed on Aug. 1, 2019, the disclosure of which is hereby incorporated by reference in its entirety.

TECHNICAL FIELD

The present disclosure relates generally to the field of wireless communication systems, and, more particularly, to an adaptive Kronecker Product Multiple Input Multiple Output (MIMO) precoding, its corresponding codebooks, signaling and the channel state information feedback of such systems. To this end, a network entity is disclosed comprising a plurality of antenna elements arranged in one or more two dimensional arrays. The network entity determines precoding vectors related to the plurality of antenna elements and for different Kronecker product tradeoff parameter values. Moreover, the network entity transmits Cell Specific Reference Signals (CRS) to a wireless communication device based on the precoding vectors and/or the Kronecker product tradeoff parameters. The present disclosure also presents a wireless communication device that receives the CRS, estimates Channel State Information (CSI) based on the received CRS, and obtains precoding vectors related to the antenna elements of the network entity and/or preferred values of the Kronecker product tradeoff parameter. The present disclosure also provides a mechanism for the wireless communication device to report to the network entity the thus obtained precoding vectors and preferred values of the Kronecker product tradeoff parameter.

BACKGROUND

Conventionally, in a wireless multiuser access scenario where a Base Station (BS) needs to communicate with multiple User Terminals (UTs), if the BS has multiple antennas and CSI about the radio links from these antennas to the different UTs in the cell area (the so-called closed-loop scenario), one practical downlink transmission scheme is the MIMO linear precoding (often referred to as transmit beamforming). This scheme consists in multiplying the data symbols to be transmitted with user and antenna dependent coefficients that are selected based on the CSI about the wireless links to the co-scheduled users, and then in adding (combining) the resulting signals before passing them to the antenna array. In practical wireless systems, special signals known by the terminals e.g., Channel State Information Reference Signal (CSI-RS) pilots in LTE and new radio (NR) systems, are normally transmitted by the BS so that the terminals can generate CSI estimates about their own wireless links from the BS. These special signals are called cell specific reference signals (CRS). The resource elements (REs) occupied by CRS symbols in the downlink and by the associated CSI feedback messages in the uplink results in an overhead that needs to be kept as low as possible in practical systems.

Moreover, if the BS antenna array is two-dimensional (2D) (as the one shown in FIG. 14), MIMO schemes should take advantage of the features offered by such array configurations. Indeed, such arrays offer both the possibility of packing a large number of antenna elements on a limited surface (thus making massive MIMO possible) and of performing three-dimensional (3D) beamforming (thus enabling elevation beamforming in addition to the more conventional azimuth-only beamforming).

FIG. 14 schematically illustrates a conventional 2D antenna array configuration 140$o$. In the conventional (non Kronecker product) MIMO precoders, the advantages offered by the large number of antennas in 2D array configurations come at the price of a larger computational complexity needed to compute the associated longer MIMO precoder vectors and a larger overhead needed to transmit CRS pilot symbols and to carry the CSI feedback messages generated based on them. Motivated by the Kronecker product property of the correlation matrix of 3D channel models, Kronecker product MIMO precoders have been proposed as a solution to alleviate these two shortcomings of 2D antenna arrays. Assuming a 2D array with $N_v$ rows and $N_h$ columns, such precoders may be described using $N_h+N_v$ coefficients each, namely $w^h \triangleq [w_1^h \ldots w_{N_h}^h]^T$ and $w^v \triangleq [w_1^v \ldots w_{N_v}^v]^T$, where the superscript T stands for the mathematical transpose operation. More precisely, the precoder coefficient applied to the antenna element in the i-th row and the j-th column of the 2D array writes as $w_i^h w_j^v$.

FIG. 15 schematically illustrates a MIMO precoder coefficients 1500 that satisfy the Kronecker product property.

The vectorized form of the MIMO precoder coefficients 1500 in FIG. 5 is the following $N_h N_v \times 1$ vector:

$$W = \begin{bmatrix} w_1^h w_1^v \\ \vdots \\ w_1^h w_{N_v}^v \\ \vdots \\ w_{N_h}^h w_1^v \\ \vdots \\ w_{N_h}^h w_{N_v}^v \end{bmatrix} = w^h \otimes w^v. \quad \text{Eq. (1)}$$

Here, the notation $\otimes$ stands for the Kronecker product. Note that reporting such a precoder vector by the UT requires feeding back only $N_h+N_v$ complex coefficients (instead of $N_h N_v$ in case non Kronecker product precoding is used). This translates into a significant reduction in CSI overhead, especially in massive MIMO systems characterized with typically large values of $N_h N_v$.

However, even with Kronecker product MIMO precoding, computing the precoding matrix could still be very challenging in some scenarios that are of practical relevance. For instance, if the quality of the CSI available at the multi-antenna BS is degraded, e.g., due to user mobility, insufficient pilot transmission frequency and/or too large CSI feedback delay, MIMO diversity schemes may be used in conjugation with MIMO precoding. One example is weighted (beamformed) space-time block coding (STBC) or frequency space-time block coding (SFBC) where the STBC/SFBC symbol codeword is precoded using a matrix determined by the imperfect CSI. In these cases, it is better to use schemes that combine MIMO beamforming and diversity. However, due to physical limitations related to radio signal propagation, there is a fundamental tradeoff between the diversity gain and the multiplexing gain, i.e., the number of data streams or UTs that may be spatially multiplexed using MIMO precoding of any MIMO scheme. This tradeoff translates into a tradeoff between reliability, i.e., low error probability, and throughput. A similar tradeoff exists between single-user and multi-user multiplexing gains, i.e., between single-user and multi-user throughput performance, in multiuser (MU) MIMO precoding schemes.

The conventional multiuser STBC scheme allows achieving a certain level of tradeoff between multiuser multiplexing and single-user achievable diversity. However, the only way to achieve a different level of this tradeoff while using this scheme is to use a different STBC/SFBC with a different diversity order. Since the use of higher-order STBC/SFBC is to be avoided in practice, due to complexity and pilot overhead issues, there is a crucial need for alternative methods that allow achieving variable levels of the aforementioned tradeoff without the need to change the STBC (or the SFBC).

Furthermore, a conventional Kronecker product MIMO precoding is proposed not only for CSI overhead reduction, but also for reducing the complexity of computing MU-MIMO precoding matrix. This is achieved by conceiving a precoder structure, in which only one component of the Kronecker product, namely the vertical/elevation component, is used for multiuser multiplexing, while the other component, namely the horizontal/azimuth component, is only used for single-user signal-to-noise ratio (SNR) maximization through maximum ratio transmission (MRT) without taking into account other users' channel matrices. While this precoder structure greatly reduces computational complexity, the associated multiuser throughput performance and the single-user throughput and reliability performances are limited by the amount of scattering offered by the elevation component of wireless channels (which is typically low in practical cellular systems). In order to alleviate this limitation, improved devices and methods are required.

SUMMARY

In view of the above-mentioned challenges and disadvantages, embodiments of the present invention aim to improve the conventional devices and methods. Thereby, an objective is to provide a network entity, a wireless communication device, a method for the network entity, and a method for the wireless communication device, which offer a simple and low-overhead procedure to control key performance tradeoff levels associated with MIMO transmission schemes. In particular, computational complexity and CSI overhead should be significantly reduced, compared to a procedure performed by a conventional MIMO precoder, e.g. a computation based on the channel vector associated with the vectorized form of a network entity (e.g., base station (BS)) 2D antenna array. Moreover, it should be possible to distinguish between the different columns or rows of the antenna array.

The objective is achieved by the embodiments provided in the enclosed independent claims. Advantageous implementations of the embodiments are further defined in the dependent claims.

A first aspect of the invention provides a network entity comprising a plurality of antenna elements arranged in one or more two dimensional, 2D, arrays having one or more columns and rows, the network entity configured to: determine at least one set of one or more precoding vectors related to the plurality of antenna elements, each entry of each precoding vector having a form of $w^h \times w^v$, wherein $w^v$ is a column specific coefficient and $w^h$ is a row specific coefficient; wherein each set of precoding vectors is associated with a different Kronecker product tradeoff parameter $L \geq 1$, wherein the value of L indicates that either each column specific coefficient $w^v$ is repeated on antenna elements forming a sub-array of L columns or each row specific coefficient $w^h$ is repeated on antenna elements forming a sub-array of L rows; and transmit, at least one set of a plurality of Cell Specific Reference Signals (CRS) to be used to estimate channel state information (CSI) based on the at least one set of precoding vectors and/or at least one Kronecker product tradeoff parameter L, wherein each element of the at least one set of CRS is a vector having a form of $p^h \times p^v$, wherein $p^v$ is a column specific coefficient and $p^h$ is a row specific coefficient, and wherein either $p^v$ is repeated on the antenna elements forming the sub-array of L columns or $p^h$ is repeated on the antenna elements forming the sub-array of L rows.

The network entity may be a multi-antenna base station. The network entity of the first aspect may have the advantage of providing the possibility to keep most of the low-overhead and low-complexity advantages of conventional MIMO precoding schemes, which are based on the Kronecker product decomposition, while it (i.e., the network entity of the invention) may further provide a simple tool to alleviate the disadvantage related to the low scattering level. The disadvantages may typically be experienced by one of the two components of any conventional Kronecker product MIMO precoder, namely the elevation direction precoder components, which put limits on the performance when using those conventional schemes.

In particular, a new transmission mode may be provided for the network entity (e.g., multi-antenna base stations, or access points, or user terminals) with two-dimensional antenna arrays to a single or a plurality of receiving devices, each having a single or a plurality of receive antennas. In this mode, the complex valued precoding coefficients applied to the transmit antenna elements making up the transmit antenna array are set to follow a Kronecker product property, i.e., each of these coefficients takes the form $w^h \times w^v$ where (as in conventional Kronecker product precoding) $w^v$ is column specific and $w^h$ is a row specific. However, the network entity sets, in an adaptive manner, either $w^v$ to be shared among all the antenna elements forming a sub-array of $L \geq 1$ columns or $w^h$ to be shared among all the antenna elements forming a sub-array of $L \geq 1$ rows (as opposed to conventional Kronecker product precoding where no such sharing is done, i.e., where L=1). Here, L is a Kronecker product tradeoff parameter that is set in an adaptive manner to control a key tradeoff in the system performance, e.g., the tradeoff between diversity and throughput/average rate, between single-user rate and sum multiuser rate or between single-user diversity and sum multiuser rate. This tuning may achieve large performance gains in scenarios such as multi-user multi-stream MIMO transmissions, single-user STBC/SFBC multi-stream transmissions and multi-user STBC/SFBC transmissions.

The network entity may comprise a circuitry. The circuitry may comprise hardware and software. The hardware may comprise analog or digital circuitry, or both analog and digital circuitry. In some embodiments, the circuitry comprises one or more processors and a non-volatile memory connected to the one or more processors. The non-volatile memory may carry executable program code which, when executed by the one or more processors, causes the device to perform the operations or methods described herein.

In an implementation form of the first aspect, the network entity is further configured to receive a feedback message from a wireless communication device indicating a determined Kronecker product tradeoff parameter L and/or a set of precoding vectors and/or precoding vector indices from a predefined set of precoding vectors corresponding to the determined Kronecker product tradeoff parameter value.

In particular, a new signaling may be provided and feedback messages may be sent (e.g., new fields in existing signaling and feedback messages) from the receiving device (the wireless communication device) needed to determine the value of the Kronecker product tradeoff parameter L and the associated complex-valued MIMO precoding coefficients to be used at the transmitter side (network entity).

In a further implementation form of the first aspect, the network entity is further configured to perform a mapping of the received Kronecker product tradeoff parameter L to the at least one set of precoding vectors; and determine a set of precoding vectors based on, at least in part, the mapping result.

In particular, a new mapping may be provided for mapping of the CRS symbols to one of a plurality of proposed patterns of antenna elements in the 2D transmit antenna array. This mapping may be needed in some embodiments of the invention in order for the wireless communication device to compute the content of the above mentioned feedback messages.

In a further implementation form of the first aspect, the network entity is further configured to update the at least one set of CRS to be used as CSI pilots based on the determined Kronecker product tradeoff parameter L; and transmit the updated at least one set of CRS to one or more wireless communication devices by mapping the entries of each element of the at least one set of CRS to the corresponding antenna elements of the one or more 2D arrays or by separately sending the vertical and horizontal components of these entries using L-order antenna aggregation, wherein each subarray of L columns or each subarray of L rows is uniquely excited using one determined value of the vertical component $p^v$ or of the horizontal component $p^h$.

For example, in some embodiment, the network entity (e.g., the base station, the access) may signal instructions to the wireless communication device (e.g., the user terminals) to start searching for the best value of the Kronecker product tradeoff parameter (and optionally of the range/set of values to search within) to the user terminals using dedicated downlink control messages.

Moreover, in some embodiments, a MIMO codebook may be provided, i.e., a set of predefined vectors each composed of a certain configuration of the complex-valued coefficients that will be applied to the transmit antenna elements, to be used in some embodiments of the invention. This codebook may be a plurality of codebooks, a family of codebooks, etc., wherein each codebook may correspond to a different value of the parameter L and may comprise vectors whose entries follow the adaptive Kronecker product configuration, or the like.

In a further implementation form of the first aspect, the network entity is further configured to transmit a control message to the wireless communication device, the control message indicating instructions for determining a Kronecker product tradeoff parameter L specified for the wireless communication device.

In a further implementation form of the first aspect, the network entity is further configured to adjust the Kronecker product tradeoff parameter L for transmission to a wireless communication device based on, at least in part, CSI feedback received from that wireless communication device.

In a further implementation form of the first aspect, the network entity is further configured to determine, for a given value of Kronecker tradeoff parameter and/or a plurality of precoding vectors corresponding to that given value, the column specific coefficients $w^v$ and/or the row specific coefficients $w^h$, independently or semi-independently from each other, wherein each coefficient is determined based on a separate performance criterion.

In a further implementation form of the first aspect, the network entity is further configured to determine a Kronecker product tradeoff parameter L based, at least in part, on the two performance criteria and/or a tradeoff between them.

In a further implementation form of the first aspect, the network entity is further configured to update the Kronecker tradeoff parameter and transmit the set of CRS required for the updating and for CSI estimation, based on a one-step CRS scheme, wherein the Kronecker product tradeoff parameter L is updated during each CRS cycle; or update the Kronecker tradeoff parameter and transmit the set of CRS required for the update and for CSI estimation, based on a two-step CRS scheme, wherein the Kronecker product tradeoff parameter L corresponding to a wireless communication device is updated only once during a period of CRS cycles comprising at least one cycle.

Moreover, in some embodiments, during the subsequent cycles of that period, the wireless communication device may report back to the network entity only the CSI related to the subset of CRS pilots plurality corresponding to the value of the Kronecker tradeoff parameter set during the first cycle of the period.

In a further implementation form of the first aspect, the network entity is further configured to store, in a Look-Up Table (LUT) one or more of: the plurality of precoding vectors; at least one Kronecker product tradeoff parameter L.

A second aspect of the invention provides a wireless communication device configured to: receive at least one set of a plurality of CRS from a network entity, wherein the network entity comprises a plurality of antenna elements arranged in one or more two dimensional, 2D, arrays having one or more columns and rows, wherein each element of the at least one set of CRS is a vector having a form of $p^h \times p^v$, wherein $p^v$ is a column specific coefficient and $p^h$ is a row specific coefficient, and wherein either $p^v$ is repeated on antenna elements forming a sub-array of $L \geq 1$ columns or $p^h$ is repeated on antenna elements forming a sub-array of L rows; estimate CSI based on the received at least one set of CRS; and obtain at least one set of one or more precoding vectors related to the plurality of antenna elements, each entry of each precoding vector having a form of $w^h \times w^v$, wherein $w^v$ is a column specific coefficient and $w^h$ is a row specific coefficient, wherein each set of precoding vectors is associated with a different Kronecker product tradeoff parameter L, and wherein the value of L indicates that either each column specific coefficient $w^v$ is repeated on the antenna elements forming the sub-array of $L \geq 1$ column or the row specific coefficient $w^h$ is repeated on the antenna elements forming the sub-array of $L \geq 1$ rows.

The wireless communication device may be a user terminal. The wireless communication device may comprise a circuitry. The circuitry may comprise hardware and software. The hardware may comprise analog or digital circuitry, or both analog and digital circuitry. In some embodiments, the circuitry comprises one or more processors and a non-volatile memory connected to the one or more processors. The non-volatile memory may carry executable program code which, when executed by the one or more processors, causes the device to perform the operations or methods described herein.

For example, in some embodiments, the wireless communication device may perform parsing instructions from the base station, determine the Kronecker product tradeoff parameter, estimating different effective channel coefficients, and may further select the best Kronecker product tradeoff parameter based on, for example, the channel estimates, the target performance tradeoff, etc.

In some embodiments, the wireless communication device may estimate different effective channel coefficients which may correspond to different values of the Kronecker product tradeoff parameter, for example, based on either precoded or non-precoded CRS pilots after referring to the relevant stored CRS pilot mapping, etc.

In an implementation form of the second aspect, the wireless communication device is further configured to determine at least one Kronecker product tradeoff parameter of L and/or a set of precoding vectors and/or precoding vector indices from a predefined set of precoding vectors corresponding to the determined Kronecker product tradeoff parameter value, based on the estimated CSI.

In a further implementation form of the second aspect, the wireless communication device is further configured to send a feedback message to the network entity indicating the determined at least one Kronecker product tradeoff parameter L and/or the set of precoding vectors and/or precoding vector indices.

In particular, the wireless communication device may report the Kronecker product tradeoff parameter to the network entity (base station) either explicitly using a dedicated feedback message or implicitly using a set of CSI feedback reports.

In a further implementation form of the second aspect, the wireless communication device is further configured to receive an updated set of CRS from the network entity, based on the determined at least one Kronecker product tradeoff parameter L and/or the set of precoding vectors and/or precoding vector indices.

In a further implementation form of the second aspect, the wireless communication device is further configured to receive a control message from the network entity, the control message indicating instructions for determining a Kronecker product tradeoff parameter L specified for the wireless communication device.

In a further implementation form of the second aspect, the wireless communication device is further configured to send adjusted Kronecker product tradeoff parameter L and/or the CSI feedback required to adjust it to the network entity based on a one-step CRS scheme, wherein the Kronecker product tradeoff parameter L is updated and sent during each CRS cycle; or send adjusted Kronecker product tradeoff parameter L and/or the CSI feedback required to adjust it to the network entity based on a two-step CRS scheme, wherein the Kronecker product tradeoff parameter L corresponding to a wireless communication device is updated and sent only once during a period of CRS cycles comprising at least one cycle.

Moreover, in some embodiments, during the subsequent cycles of that period, the wireless communication device may report back to the network entity only the CSI related to the subset of CRS pilots plurality corresponding to the value of the Kronecker tradeoff parameter set during the first cycle of the period.

In a further implementation form of the second aspect, the wireless communication device is further configured to receive a LUT or an index pointing to one LUT within a plurality of predefined LUTs, from the network entity indicating: the plurality of vectors; and/or at least one Kronecker product tradeoff parameter L.

A third aspect of the invention provides a method for network entity comprising a plurality of antenna elements arranged in one or more two dimensional, 2D, arrays, the method comprising determining at least one set of one or more precoding vectors related to the plurality of antenna elements, each entry of each precoding vector having a form of $w^h \times w^v$, wherein $w^v$ is a column specific coefficient and $w^h$ is a row specific coefficient; wherein each set of precoding vectors is associated with a different Kronecker product tradeoff parameter $L \geq 1$, wherein the value of L indicates that either each column specific coefficient $w^v$ is repeated on antenna elements forming a sub-array of L columns or each row specific coefficient $w^h$ is repeated on antenna elements forming a sub-array of L rows; and transmitting, at least one set of a plurality of CRS to be used to estimate CSI based on the at least one set of precoding vectors and/or at least one Kronecker product tradeoff parameter L, wherein each element of the at least one set of CRS is a vector having a form of $p^h \times p^v$, wherein $p^v$ is a column specific coefficient and $p^h$ is a row specific coefficient, and wherein either $p^v$ is repeated on the antenna elements forming the sub-array of L columns or $p^h$ is repeated on the antenna elements forming the sub-array of L rows.

In an implementation form of the third aspect, the method further comprises receiving a feedback message from a wireless communication device indicating a determined Kronecker product tradeoff parameter L and/or a set of precoding vectors and/or precoding vector indices from a predefined set of precoding vectors corresponding to the determined Kronecker product tradeoff parameter value.

In a further implementation form of the third aspect, the method further comprises performing a mapping of the received Kronecker product tradeoff parameter L to the at least one set of precoding vectors; and determining a set of precoding vectors based on, at least in part, the mapping result.

In a further implementation form of the third aspect, the method further comprises updating the at least one set of CRS to be used as CSI pilots based on the determined Kronecker product tradeoff parameter L; and transmitting the updated at least one set of CRS to one or more wireless communication devices by mapping the entries of each element of the at least one set of CRS to the corresponding antenna elements of the one or more 2D arrays or by separately sending the vertical and horizontal components of these entries using L-order antenna aggregation, wherein each subarray of L columns or each subarray of L rows is uniquely excited using one determined value of the vertical component $p^v$ or of the horizontal component $p_h$.

In a further implementation form of the third aspect, the method further comprises transmitting a control message to the wireless communication device, the control message indicating instructions for determining a Kronecker product tradeoff parameter L specified for the wireless communication device.

In a further implementation form of the third aspect, the method further comprises adjusting the Kronecker product tradeoff parameter L for transmission to a wireless communication device based on, at least in part, CSI feedback received from that wireless communication device.

In a further implementation form of the third aspect, the method further comprises determining, for a given value of Kronecker tradeoff parameter and/or a plurality of precoding vectors corresponding to that given value, the column specific coefficients $w^v$ and/or the row specific coefficients $w^h$, independently or semi-independently from each other, wherein each coefficient is determined based on a separate performance criterion.

In a further implementation form of the third aspect, the method further comprises determining a Kronecker product tradeoff parameter L based, at least in part, on the two performance criteria and/or a tradeoff between them.

In a further implementation form of the third aspect, the method further comprises updating the Kronecker tradeoff parameter and transmit the set of CRS required for the updating and for CSI estimation, based on a one-step CRS scheme, wherein the Kronecker product tradeoff parameter L is updated during each CRS cycle; or updating the Kronecker tradeoff parameter and transmit the set of CRS required for the update and for CSI estimation, based on a two-step CRS scheme, wherein the Kronecker product tradeoff parameter L corresponding to a wireless communication device is updated only once during a period of CRS cycles comprising at least one cycle.

In a further implementation form of the third aspect, the method further comprises storing, in a LUT one or more of: the plurality of precoding vectors; at least one Kronecker product tradeoff parameter L.

A fourth aspect of the invention provides a method for a wireless communication device, the method comprising receiving at least one set of a plurality of CRS from a network entity, wherein the network entity comprises a plurality of antenna elements arranged in one or more two dimensional, 2D, arrays having one or more columns and rows, wherein each element of the at least one set of CRS is a vector having a form of $p^h \times p^v$, wherein $p^v$ is a column specific coefficient and $p^h$ is a row specific coefficient, and wherein either $p^v$ is repeated on antenna elements forming a sub-array of $L \geq 1$ columns or $p^h$ is repeated on antenna elements forming a sub-array of L rows; estimating CSI based on the received at least one set of CRS; and obtaining at least one set of one or more precoding vectors related to the plurality of antenna elements, each entry of each precoding vector having a form of $w^h \times w^v$, wherein $w^v$ is a column specific coefficient and $w^h$ is a row specific coefficient, wherein each set of precoding vectors is associated with a different Kronecker product tradeoff parameter L, and wherein the value of L indicates that either each column specific coefficient $w^v$ is repeated on the antenna elements forming the sub-array of $L \geq 1$ column or the row specific coefficient $w^h$ is repeated on the antenna elements forming the sub-array of $L \geq 1$ rows.

In an implementation form of the fourth aspect, the method further comprises determining at least one Kronecker product tradeoff parameter of L and/or a set of precoding vectors and/or precoding vector indices from a predefined set of precoding vectors corresponding to the determined Kronecker product tradeoff parameter value, based on the estimated CSI.

In a further implementation form of the fourth aspect, the method further comprises sending a feedback message to the network entity indicating the determined at least one Kronecker product tradeoff parameter L and/or the set of precoding vectors and/or precoding vector indices.

In a further implementation form of the fourth aspect, the method further comprises receiving an updated set of CRS from the network entity, based on the determined at least one Kronecker product tradeoff parameter L and/or the set of precoding vectors and/or precoding vector indices.

In a further implementation form of the fourth aspect, the method further comprises receiving a control message from the network entity, the control message indicating instructions for determining a Kronecker product tradeoff parameter L specified for the wireless communication device.

In a further implementation form of the fourth aspect, the method further comprises sending adjusted Kronecker product tradeoff parameter L and/or the CSI feedback required to adjust it to the network entity based on a one-step CRS scheme, wherein the Kronecker product tradeoff parameter L is updated and sent during each CRS cycle; or sending adjusted Kronecker product tradeoff parameter L and/or the CSI feedback required to adjust it to the network entity based on a two-step CRS scheme, wherein the Kronecker product tradeoff parameter L corresponding to a wireless communication device is updated and sent only once during a period of CRS cycles comprising at least one cycle.

In a further implementation form of the fourth aspect, the method further comprises receiving a Look-Up Table, LUT, or an index pointing to one LUT within a plurality of predefined LUTs, from the network entity indicating: the plurality of vectors; and/or at least one Kronecker product tradeoff parameter L.

An advantage of embodiments of the invention is the possibility of conceiving Multi User (MU)-MIMO/massive-MIMO precoding schemes that are robust to user mobility that are low in both computational complexity and in CSI feedback overhead. This may be achieved due to the proposed adaptive Kronecker product precoding scheme that allows an efficient (balanced combining) of MIMO precoding or beamforming and STBC/SFBC. For example, with the MIMO or beamforming precoder that provides multiuser multiplexing and the STBC/SFBC modules that provides robustness against mobility induced CSI degradation.

The adaptive Kronecker product MIMO precoding of the embodiments of the invention may also outperform conventional MIMO schemes in scenarios where data should be delivered under low-latency high-reliability constraints, e.g., augmented reality (AR), virtual reality (VR), etc. For these services, maximizing throughput is not sufficient due to the additional afore-mentioned constraints. The adaptive property of the proposed Kronecker product MIMO precoding allows achieving several tradeoff levels between reliability/latency on the one hand and throughput on the other that is close to the optimal operation point than what is allowed by a more conventional MIMO precoding scheme (whether of a Kronecker product nature or not).

It has to be noted that all devices, elements, units and means described in the present application could be implemented in the software or hardware elements or any kind of combination thereof. All steps which are performed by the various entities described in the present application as well as the functionalities described to be performed by the various entities are intended to mean that the respective entity is adapted to or configured to perform the respective steps and functionalities. Even if, in the following description of specific embodiments, a specific functionality or step to be performed by external entities is not reflected in the description of a specific detailed element of that entity which performs that specific step or functionality, it should be clear for a skilled person that these methods and functionalities can be implemented in respective software or hardware elements, or any kind of combination thereof.

BRIEF DESCRIPTION OF THE DRAWINGS

The above described aspects and implementation forms of the present invention will be explained in the following description of specific embodiments in relation to the enclosed drawings, in which.

DETAILED DESCRIPTION OF ILLUSTRATIVE EMBODIMENTS

Figure 1:
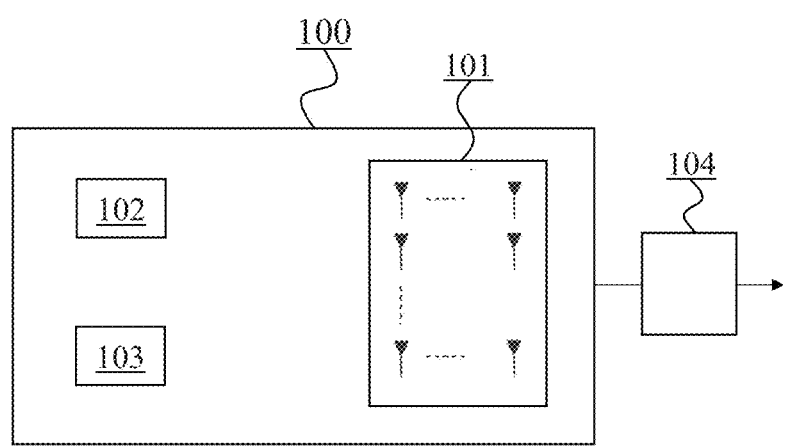
FIG. 1 is a schematic view of a network entity comprising a plurality of antenna elements arranged in a 2D array, according to an embodiment of the present invention.

FIG. 1 is a schematic view of a network entity 100 comprising a plurality of antenna elements 101 arranged in a 2D array, according to an embodiment of the present invention.

The network entity may be for example, a base station, an access point, etc. The 2D array of the network entity 100 of FIG. 1 may have one or more columns and rows.

The network entity 100 configured to determine at least one set of one or more precoding vectors 102, 103 related to the plurality of antenna elements 101, each entry of each precoding vector having a form of $w^h \times w^v$, wherein $w^v$ is a column specific coefficient and $w^h$ is a row specific coefficient; wherein each set of precoding vectors 102, 103 is associated with a different Kronecker product tradeoff parameter $L \geq 1$, wherein the value of L indicates that either each column specific coefficient $w^v$ is repeated on antenna elements forming a sub-array of L columns or each row specific coefficient $w^h$ is repeated on antenna elements forming a sub-array of L rows.

The network entity 100 is further configured to transmit, at least one set of a plurality of CRS 104, to be used to estimate CSI based on the at least one set of precoding vectors 102, 103 and/or at least one Kronecker product tradeoff parameter L, wherein each element of the at least one set of CRS 104 is a vector having a form of $p^h \times p^v$, wherein $p^v$ is a column specific coefficient and $p^h$ is a row specific coefficient, and wherein either $p^v$ is repeated on the antenna elements forming the sub-array of L columns or $p^h$ is repeated on the antenna elements forming the sub-array of L rows.

For example, the network entity may transmit (explicitly or implicitly) the Kronecker product tradeoff parameter.

For instance, a user specific adaptive Kronecker product MIMO precoder may be provided with each one of the two terms of the Kronecker product may be computed independently or semi-independently from the other based on a performance or an optimization criterion. Moreover, the adaptation parameter of the Kronecker product may be determined based on a target tradeoff between, e.g., these two performance criteria.

The network entity 100 may comprise a circuitry (not shown in FIG. 1). The circuitry may comprise hardware and software. The hardware may comprise analog or digital circuitry, or both analog and digital circuitry. In some embodiments, the circuitry comprises one or more processors and a non-volatile memory connected to the one or more processors. The non-volatile memory may carry executable program code which, when executed by the one or more processors, causes the device to perform the operations or methods described herein.

Figure 2:
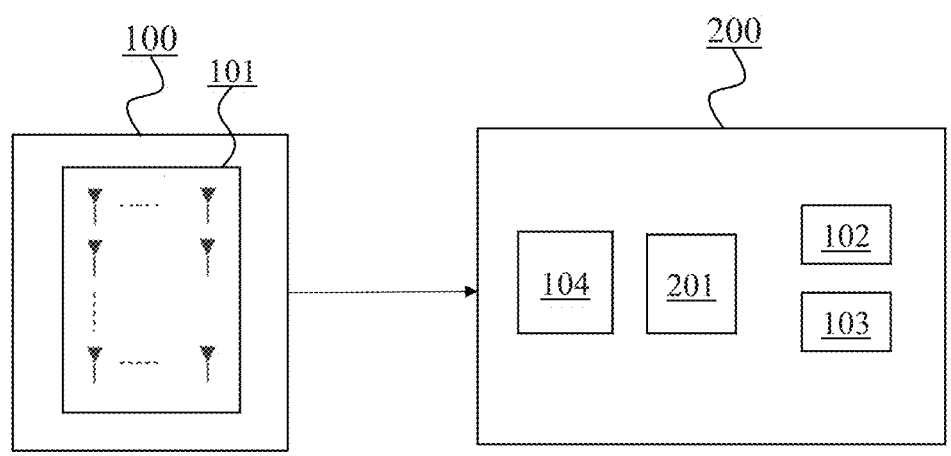
FIG. 2 is a schematic view of a wireless communication device, according to an embodiment of the present invention. The antenna elements of this device can be arranged in a 2D array or in any other geometric setting.

Reference is made to FIG. 2 which is a schematic view of a wireless communication device 200, according to an embodiment of the present invention.

The wireless communication device 200 may be, for example, a user terminal, a user equipment (UE), etc.

The wireless communication device 200 configured to receive at least one set of a plurality of CRS 104, from a network entity 100, wherein the network entity 100 comprises a plurality of antenna elements 101 arranged in one or more two dimensional, 2D, arrays having one or more columns and rows, wherein each element of the at least one set of CRS is a vector having a form of $p^h \times p^v$, wherein $p^v$ is a column specific coefficient and $p^h$ is a row specific coefficient, and wherein either $p^v$ is repeated on antenna elements forming a sub-array of $L \geq 1$ columns or $p^h$ is repeated on antenna elements forming a sub-array of L rows.

The wireless communication device 200 is further configured to estimate CSI 201 based on the received at least one set of CRS 104.

The wireless communication device 200 is further configured to obtain at least one set of one or more precoding vectors 102, 103 related to the plurality of antenna elements 101, each entry of each precoding vector 102, 103 having a form of $w^h \times w^v$, wherein $w^v$ is a column specific coefficient and $w^h$ is a row specific coefficient, wherein each set of precoding vectors 102, 103 is associated with a different Kronecker product tradeoff parameter L, and wherein the value of L indicates that either each column specific coefficient $w^v$ is repeated on the antenna elements forming the sub-array of L≥1 column or the row specific coefficient $w^h$ is repeated on the antenna elements 101 forming the sub-array of L≥1 rows.

The wireless communication device may comprise a circuitry (not shown in FIG. 2). The circuitry may comprise hardware and software. The hardware may comprise analog or digital circuitry, or both analog and digital circuitry. In some embodiments, the circuitry comprises one or more processors and a non-volatile memory connected to the one or more processors. The non-volatile memory may carry executable program code which, when executed by the one or more processors, causes the device to perform the operations or methods described herein.

Figure 3A:
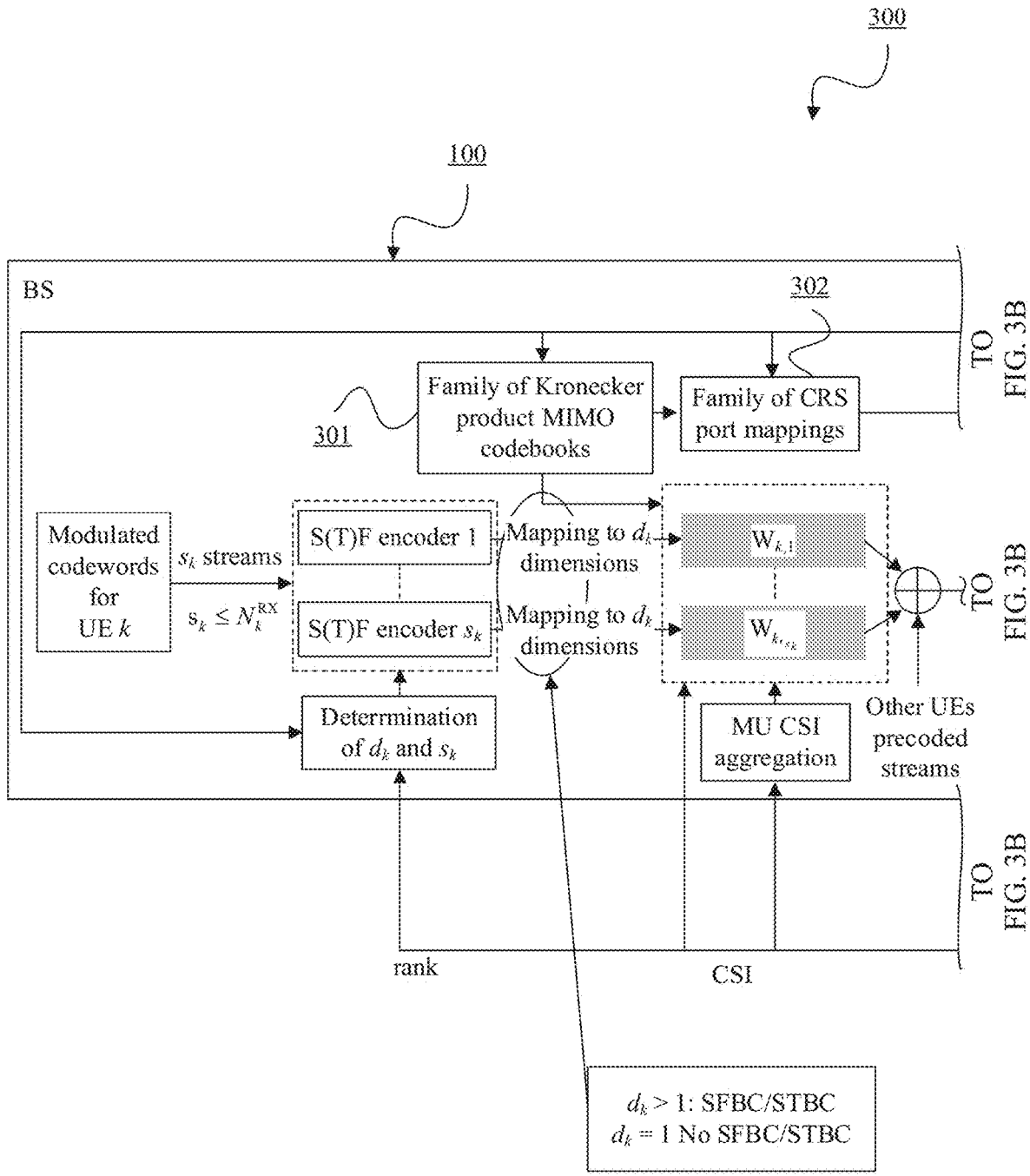
FIGS. 3A and 3B are a schematic view of a MU-MIMO wireless communication system comprising the network entity and the wireless communication device, according to an embodiment of the present invention.
Figure 3B:
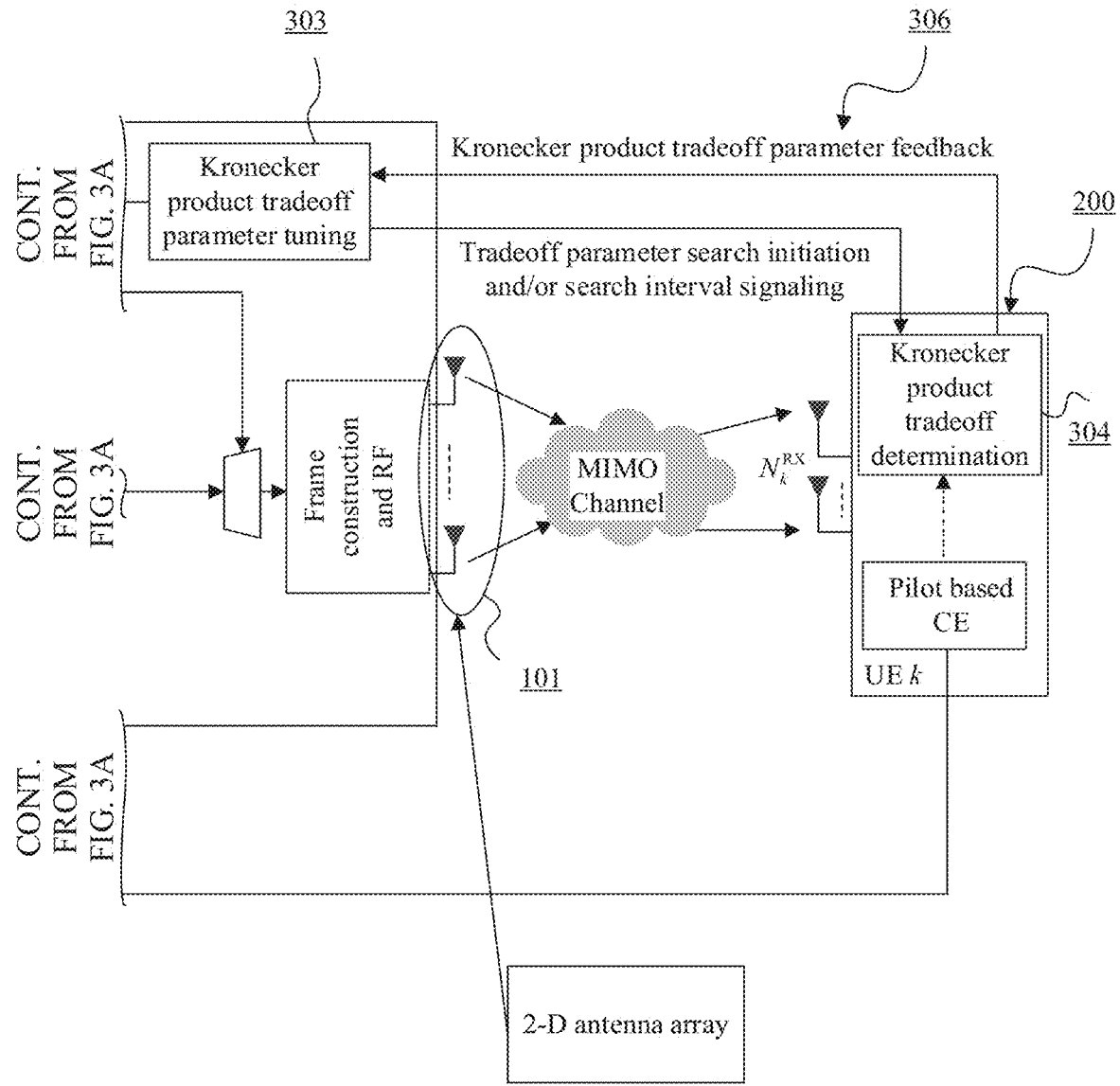

Reference is made to FIGS. 3A and 3B which is a schematic view of a MU-MIMO wireless communication system 300 comprising the network entity 100 and the wireless communication device 200, according to an embodiment of the present invention.

In the embodiment of FIGS. 3A and 3B the network entity 100 is based on a BS and the wireless communication device 200 is based on a UE.

The network entity 100 (i.e., the BS) comprises the (optional) module of "family of Kronecker product MIMO codebooks" 301 that stores (for example, in a formula or in look-up table form, etc.) the set of precoding vectors 102, 103 which make a family of MIMO codebooks. Moreover, each codebook may be defined by one value of the Kronecker product tradeoff parameter.

The network entity 100 (i.e., the BS) further comprises the (optional) module of "family of CRS port mapping" 302 which stores (for example, in a formula form or in another mapping representation form) a family of antenna aggregation schemes for the CRS transmission. For instance, each one of these schemes corresponds to a mapping of CRS symbols to antenna elements 101 in which the symbol repeated on a number of array columns that is equal to one of the possible values of the adaptive Kronecker product tradeoff parameter.

The MU-MIMO wireless communication system 300 further comprises the wireless communication device 200 (i.e., the UE). The wireless communication device 200 comprises the module "Kronecker product tradeoff determination" 304. Moreover, the channel estimates (CE) that are obtained at the receiver side (at the wireless communication device 200) based on the CRS pilots 104 are used by the module "Kronecker product tradeoff determination" 304, for example, upon the reception of a "tradeoff parameter search initiation and/or search interval signaling" control message from the network entity 100 (base station/access point). Furthermore, the CRS based CSI estimates are used either to directly determine the best tradeoff parameter value or to prepare a CSI feedback report with multiple CSI values that may help the network entity boo (base station/access point) to determine the best value of this parameter for the wireless communication device 200 (the user terminal).

The output of this module is thus a "Kronecker product tradeoff parameter feedback" 306 that comprises the best value of the tradeoff parameter either in an explicit or in an implicit manner.

The implicit/explicit Kronecker tradeoff parameter feedback 306 received from the wireless communication device 200 (the user terminal) may be used by the "Kronecker product tradeoff parameter tuning" module 303 at the network entity (base station/access point) in order to determine the value of the tradeoff parameter to be used in the subsequent adaptive Kronecker product precoded pilot and data transmissions to the wireless communication device 200 (the user terminal), as it is illustrated by the modules of the block diagram to which the output of this module is connected.

Figure 4:
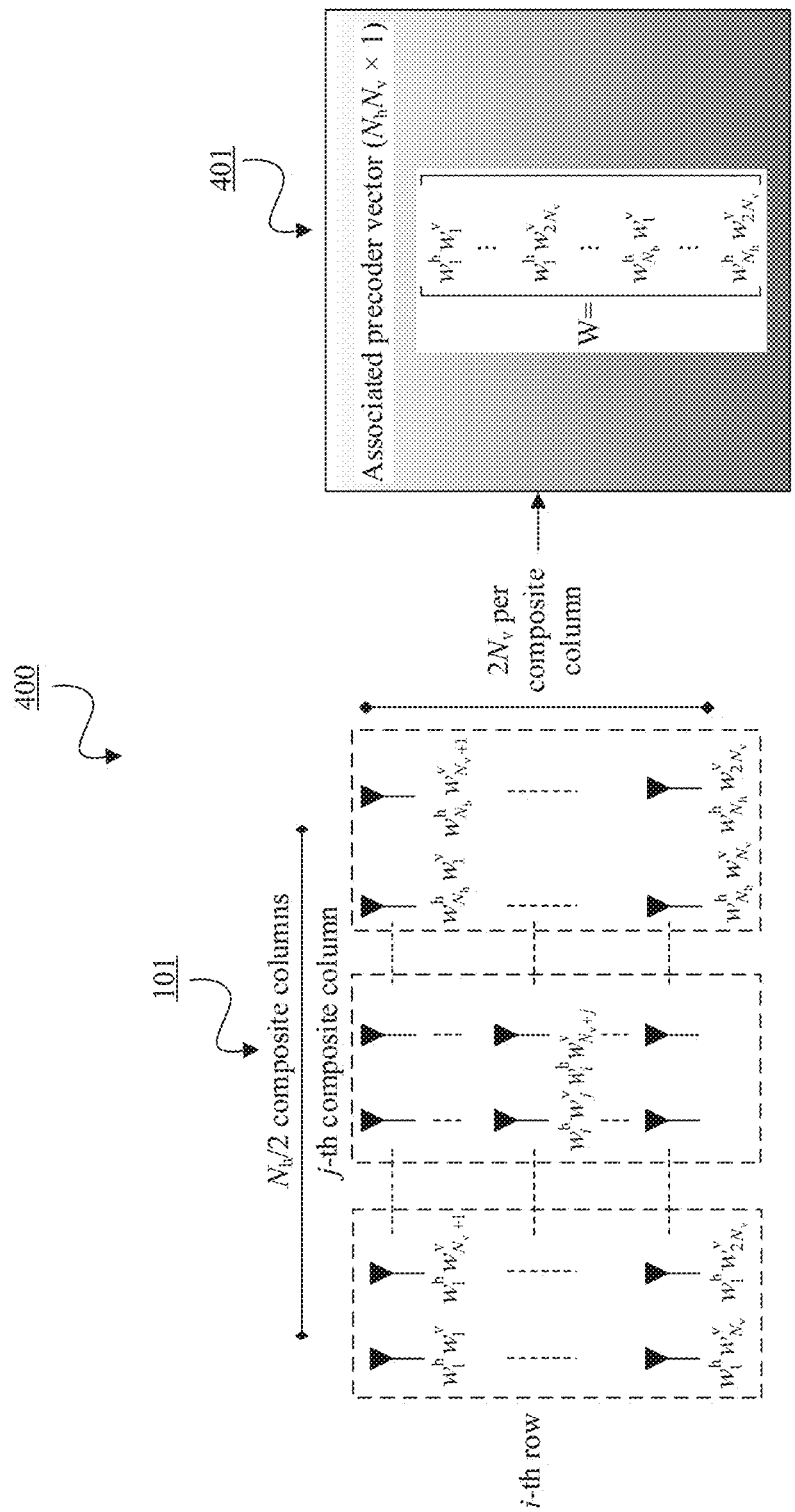
FIG. 4 is an exemplarily schematic view of an adaptive Kronecker product MIMO precoder for a $N_h \times k$ 2D antenna array in the case of L=2.

Reference is made to FIG. 4 which is a schematic view of an exemplarily adaptive Kronecker product MIMO precoder 401 for a $N_h \times N_v$ 2-dimensional antenna array in case of L=2.

An example of the structure of an adaptive Kronecker product MIMO precoder vector 401 in the case where the tradeoff parameter is set to L=2 is illustrated. Moreover, from the scheme 400 of the FIG. 4, it may be derived, how the entries of this vector 401 are applied to a two-dimensional antenna array (for example, from the plurality of antenna element 101 of the 2D array of the network entity 100).

In addition, in order to give the wireless communication device 100, the possibility to determine both the best value of the Kronecker product tradeoff parameter L and the associated CSI, in some embodiments of the invention a novel mapping of the CRS ports to antenna elements may be provided. The mapping may be based on using a family of antenna aggregation schemes each parameterized with a different value of L. An example of a member of this family corresponding to some CRS antenna aggregation value L>1 is shown in FIG. 5.

Figure 5:
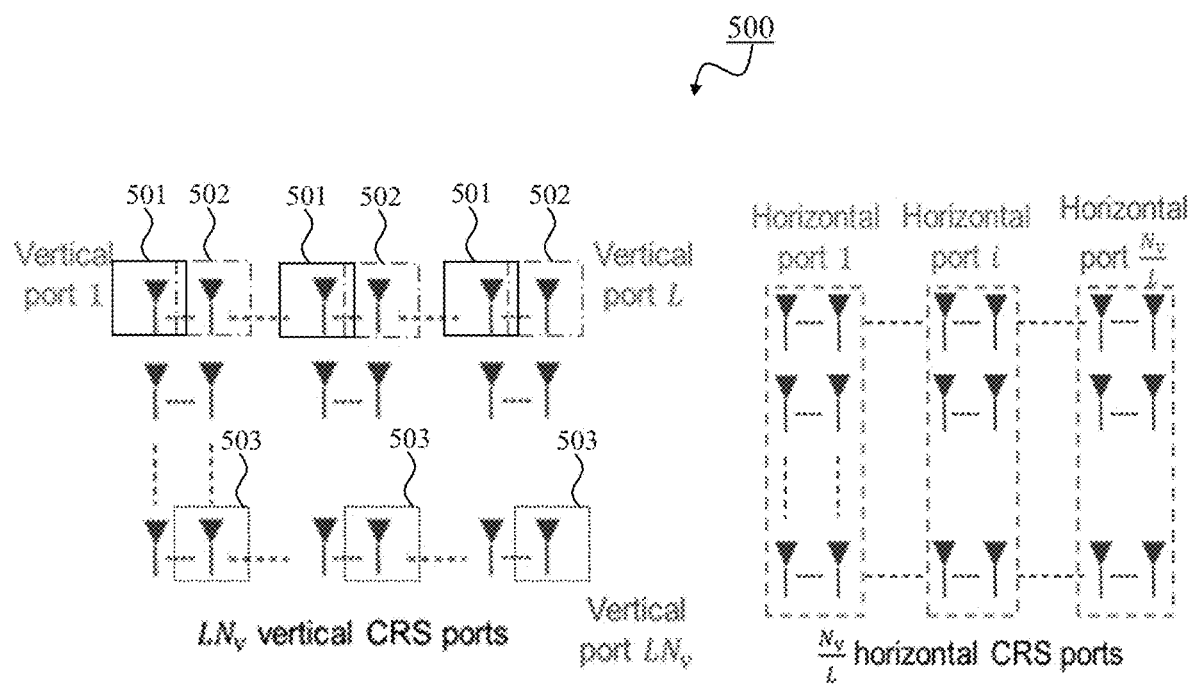
FIG. 5 is an exemplarily schematic view of a CRS pilot mapping using L-order antenna aggregation.

Reference is made to FIG. 5 which is an exemplarily schematic view of a CRS pilot mapping 500 for the non-codebook MIMO.

It is worth mentioning that, the conventional antenna aggregation schemes for CRS pilots, correspond to the L=1-member of the proposed family of CRS antenna aggregation schemes. In FIG. 5, on the lefts side, an example of an L-order CRS antenna aggregation scheme to transmit the $LN_v$ vertical components of the CRS pilots is illustrated. Moreover; the indicated reference 501 represents the antenna elements aggregated to transmit the first vertical component of CRS pilots (i.e., the vertical port 1), the indicated reference 502 represents the antenna elements aggregated to transmit the second vertical component of CRS pilots (i.e., the vertical port 2), and the indicated reference 503 represents the antenna elements aggregated to transmit the $LN_v$-th vertical component of CRS pilots (i.e., the vertical port $LN_v$). Furthermore, on the right side, an example of an L-order CRS antenna aggregation scheme for transmitting the $N_v/L$ horizontal components of the CRS pilots is also illustrated.

Furthermore, given $N_c \geq 1$ possible values of the antenna aggregation parameter $\{L_1, \ldots, L_{N_c}\}$, transmitting all of the CRS ports corresponding to these values requires a total of $\sum_{n=1}^{N_c}(P_{v,n}+P_{h,n})$ CRS ports, where $$P_{v,n} \leq L_n N_v \text{ and } P_{h,n} \leq \frac{N_h}{L_n}.$$

Note that, the value of $\sum_{n=1}^{N_c}(P_{v,n}+P_{h,n})$ may be smaller than the original number of CRS ports in the non-codebook MIMO e.g., $N_h N_v$. This new pilot mapping may be used with both non-codebook and codebook based Adaptive Kronecker product schemes. Moreover, it is compatible with both of the (conventional) 1-step CRS feedback mode and 2-step CRS feedback mode as it is discussed in the following.

In the following (e.g., FIG. 6 and FIG. 7) codebook based adaptive Kronecker product scheme without CRS antenna aggregation are illustrated.

Figure 6:
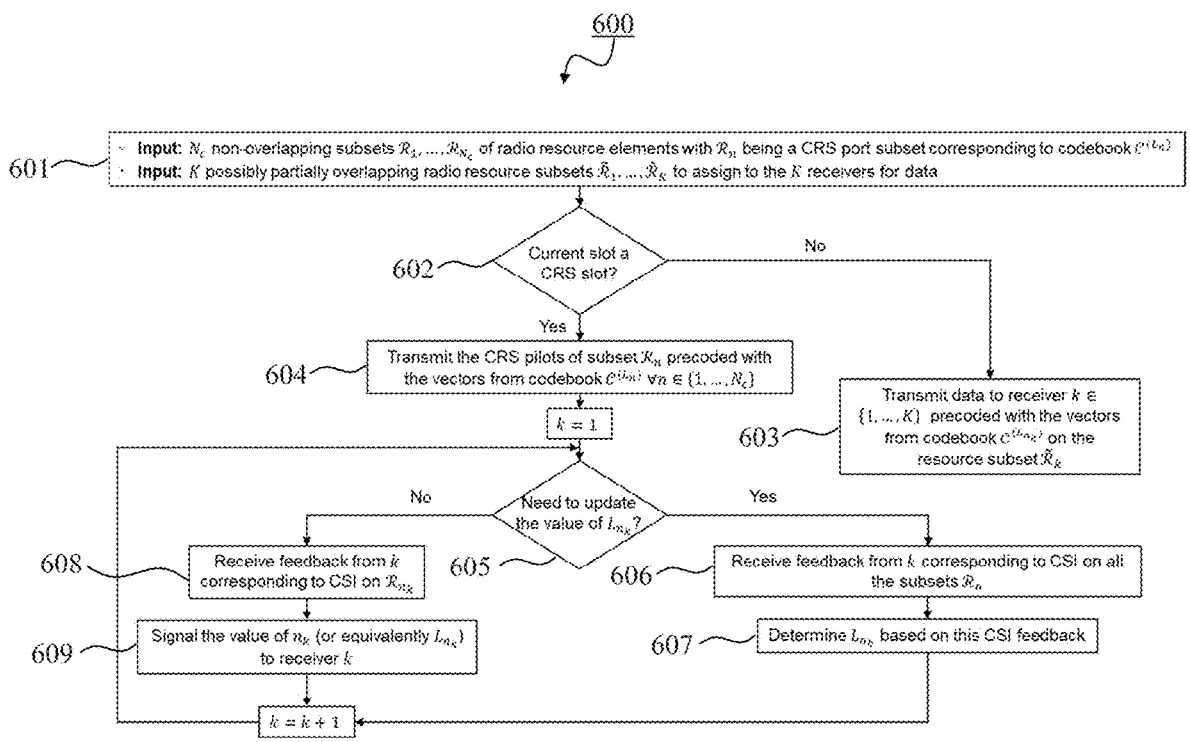
FIG. 6 is a flow diagram of the adaptive Kronecker product codebook MIMO transmission at the network entity.

Reference is made to FIG. 6 which is a flow diagram 600 of the adaptive Kronecker product codebook MIMO transmission at the network entity 100.

In this embodiment, the adaptive Kronecker product MIMO precoders are chosen from a family of $N_c$ codebooks $$C^{(L_1)}, C^{(L_2)}, \ldots, C^{(L_{N_c})},$$

where $N_c$ is the number of possible values of the Kronecker product tradeoff parameter L. An example method for constructing $C^{(L)}$ ($1 \leq L \leq N_c$) is according to Eq. (2).

$$C^{(L)} = \left\{ c^{(L)}_{\lfloor \frac{N_h}{L} \rfloor (j-1)+i} = \tilde{c}^h_i \otimes \tilde{c}^v_j \right\}_{i=1,\ldots,\lfloor \frac{N_h}{L} \rfloor, j=1,\ldots,LN_v} \quad \text{Eq. (2)}$$

Moreover, the Eq. (3) ad Eq. (4) may be defined as follows:

$$\tilde{c}^h_i = \frac{1}{\sqrt{\lfloor \frac{N_h}{L} \rfloor}} \left[ 1 \; e^{i \frac{2\pi(i-1)L}{\lfloor \frac{N_h}{L} \rfloor}} \; \ldots \; e^{i \frac{2\pi(\lfloor \frac{N_h}{L} \rfloor -1)(i-1)L}{\lfloor \frac{N_h}{L} \rfloor}} \right]^T, \quad \text{Eq. (3)}$$

$$i = 1, \ldots, \left\lfloor \frac{N_h}{L} \right\rfloor,$$

$$\tilde{c}^v_{L(j-1)+i} = \tilde{c}^h_i \otimes \tilde{c}^v_j, j = 1, \ldots, N_v, i = 1, \ldots, L, \text{ and,}$$

$$\bar{c}^h_i = \frac{1}{\sqrt{L}} \left[ 1 \; e^{i \frac{2\pi(i-1)}{L}} \; \ldots \; e^{i \frac{2\pi(L-1)(i-1)}{L}} \right]^T,$$

$$\bar{c}^v_j = \frac{1}{\sqrt{N_v}} \left[ 1 \; e^{i \frac{2\pi(j-1)}{N_v}} \; \ldots \; e^{i \frac{2\pi(N_v-1)(j-1)}{N_v}} \right]^T.$$

The setting of the L=1 in the above definition results in the conventional 2D DFT MIMO codebook adopted in the 3GPP standards.

In some embodiments of the invention, the entries of the vectors making up the codebooks are stored in the lookup tables indexed with respect to different possible combinations of the values of $N_h$, $N_v$ and L. In some other embodiments, these coefficients may be computed, e.g., using the above mathematical formulas (e.g., Eq. (2), Eq. (3) and Eq. (4)) implemented using dedicated code or circuitry at the network entity 100 (transmitting device).

The network entity 100 (base station) uses all the $N_c$ codebooks to precode the CRS pilots on $N_c$ non-overlapping time, frequency, code, power resource subsets (referred to in the flow diagrams as $\mathcal{R}_1, \ldots, \mathcal{R}_{N_c}$). This embodiment is compatible with both one-step and two-step CRS schemes. In the one-step CRS, the value of L is updated during each CRS cycle. In the two-step CRS, the updating is done as follows. With low periodicity, the users may detect the pilot signals on all of these resource subsets in order to update their best value of L (this updating is either done at the receiver side based on this detection or at the transmitter side based on feedback from the receiver with related CSI values resulting from this detection). With a higher periodicity, the users may only detect the pilot signals on the resource subsets corresponding to their optimal value of L and may further feedback only the associated restricted CSI.

The flow diagram of the steps needed to be performed at the network entity 100 (the transmitter side) for pilot and data transmission may be as follows:

At 601, the network entity 100 obtains input data.

The input data may be, for example, one or more of:

$N_c$ non-overlapping subsets $\mathcal{R}_1, \ldots, \mathcal{R}_{N_c}$ of radio resource elements with $\mathcal{R}_n$ being a CRS port subset corresponding to codebook $C^{(L_n)}$;

K possibly partially overlapping radio resource subsets $\tilde{\mathcal{R}}_1, \ldots, \tilde{\mathcal{R}}_K$ to assign to the K receivers for data.

At 602, the network entity 100 determines whether the current slot is a CRS slot or not. Moreover, when it is determines "Yes" the network entity 100 goes to 604, however, when it is determined "No", the network entity goes to 603.

At 603, the network entity 100 transmits data to the wireless communication device 100 (receiver) k∈{1, . . . , K} precoded with the vectors from the codebook $$C^{(L_{n_k})}$$

on the resource subset $\tilde{\mathcal{R}}_k$, wherein $L_{n_k}$ is the latest available value of the Kronecker product tradeoff parameter for wireless communication device k.

At 604, the network entity 100 transmits the CRS pilots of the subset $\mathcal{R}_n$ precoded with the vectors from the codebook $C^{(L_n)} \forall n \in \{1, \ldots, N_c\}$.

At 605, the network entity 100 determines if it is required to update the value of $L_{n_k}$. Moreover, when it determines "Yes" the network entity 100 goes to 606, however, when it is determined "No", the network entity goes to 608.

At 606, the network entity 100 receives a feedback from k corresponding to CSI on all of the subsets $\mathcal{R}_n$ At 607, the network entity 100 determines the value of $L_{n_k}$ based on the obtained CSI feedback. Moreover, the value of the wireless communication device index k will be updated to k+1 and the network entity goes to 605.

At 608, the network entity 100 receives a feedback from k corresponding to CSI on $\mathcal{R}_{n_k}$.

At 609, the network entity 100 signals the value of $n_k$ (or equivalently $L_{n_k}$) to the receiver k. Moreover, the value of the k will be updated to k+1 and the network entity goes to 605.

Figure 7:
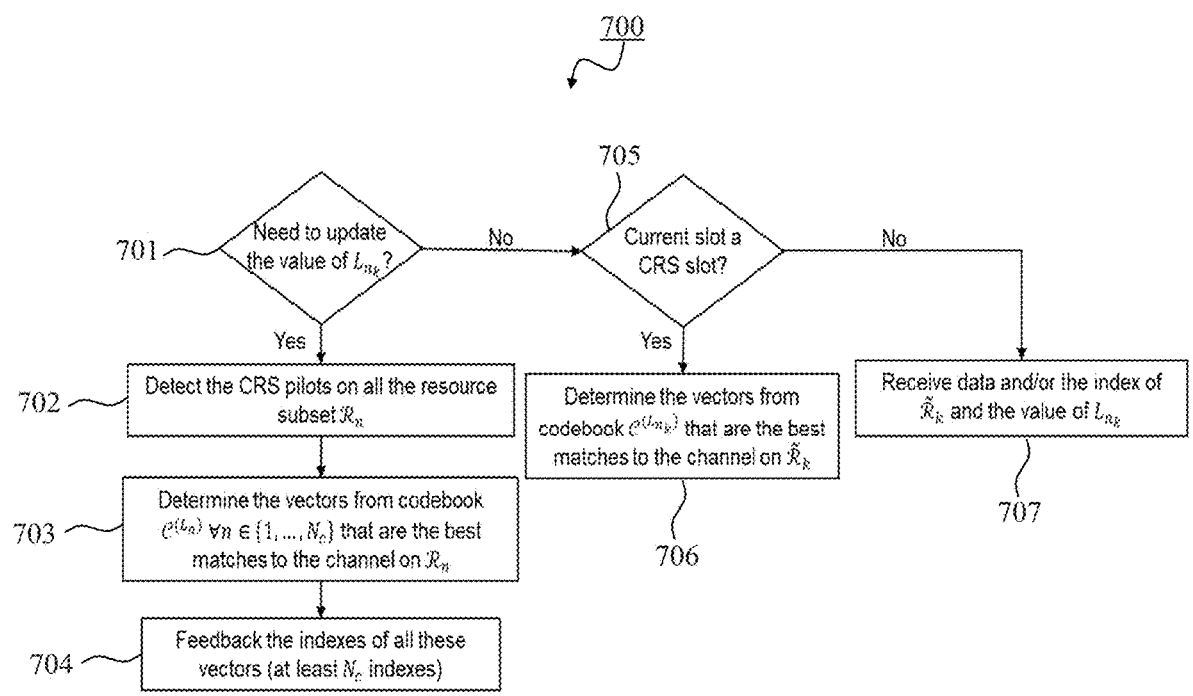
FIG. 7 is a flow diagram of pilot and data reception of the adaptive Kronecker product codebook MIMO at the wireless communication device.

Reference is made to FIG. 7 which is a flow diagram 700 of pilot and data reception of the adaptive Kronecker product codebook MIMO at the wireless communication device 100.

At 701, the wireless communication device 200 determines whether it is need to update the value of $L_{n_k}$ or not. Moreover, when it is determined "Yes", the wireless communication device 200 goes to step 702, however, when it is determined "No", the wireless communication device 200 goes to step 705.

At 702, the wireless communication device 200 detects the CRS pilots on all of the resource subset $\mathcal{R}_n$.

At 703, the wireless communication device 200 determines the vectors from the codebook $C^{(L_n)} \forall n \in \{1, \ldots, N_c\}$ that are the best matches to the channel on $\mathcal{R}_n$.

At 704, the wireless communication device 200 sends a feedback message comprising the indexes of all of these vectors (for example, there are at least $N_c$ indexes).

At 705, the wireless communication device 200 determines whether the current slot is a CRS slot or not.

Moreover, when it is determined "Yes", the wireless communication device 200 goes to step 706, however, when it is determined "No", the wireless communication device 200 goes to step 707.

At 706, the wireless communication device 200 determines the vectors from the codebook $$C^{(L_{n_k})}$$

that are the best matches to the channel on $\tilde{\mathcal{R}}_k$.

At 707, the wireless communication device 200 receives data and/or the index of $\tilde{\mathcal{R}}_k$ and the value of $L_{n_k}$.

In some embodiments, the codebook and/or the non-codebook adaptive Kronecker product scheme with one-step CRS antenna aggregation may be provided.

For example, in some embodiments, the CRS ports with L-parametrized antenna aggregation corresponding to all of the possible values of the parameter L may be transmitted in every CRS slot. Moreover, the wireless communication device 200 (the receiver) may feedback the estimated CSI corresponding to all of these ports. The flow diagram of the steps needed to be performed at the network entity 100 (transmitter side) is shown in FIG. 8.

Figure 8:
FIG. 8 is a flow diagram of pilot and data transmission of the adaptive Kronecker product MIMO with CRS antenna aggregation at the network entity during one-step CRS cycle.
Figure 8:
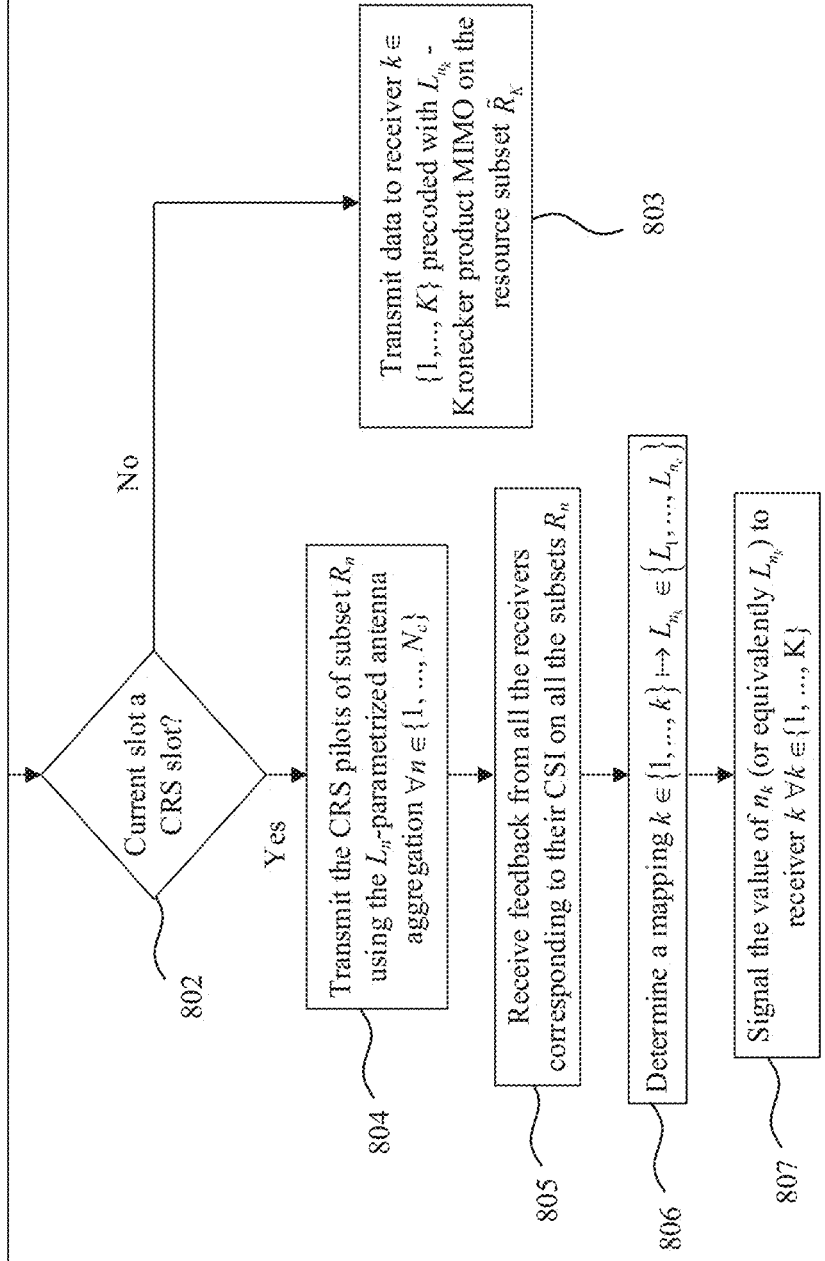

Reference is made to FIG. 8 which is a flow diagram 800 of pilot and data transmission of the adaptive Kronecker product MIMO with CRS antenna aggregation at the network entity 100 during one-step CRS cycle.

At 801, the network entity 100 obtains the input data.

The input data may be for example, one or more of:

$N_c$ non-overlapping subsets $\mathcal{R}_1, \ldots, \mathcal{R}_{N_c}$ of radio resource elements with $\mathcal{R}_n$ being a CRS port subset corresponding to one antenna aggregation parameter value $L_n$;

K possibly partially overlapping radio resource subsets $\tilde{\mathcal{R}}_1, \ldots, \tilde{\mathcal{R}}_K$ to assign to the K receivers for data.

At 802, the network entity 100 determines whether the current slot is a CRS slot or not. Moreover, when it is determined "Yes", the network entity 100 goes to step 804, however, when it is determined "No", the network entity 100 goes to step 803.

At 803, the network entity 100 transmits data to the wireless communication device 200 (the receiver) k∈{1, ..., K} precoded with the $L_{n_k}$-Kronecker product MIMO on the resource subset $\tilde{\mathcal{R}}_k$, wherein $L_{n_k}$ is the latest available value of the Kronecker product tradeoff parameter for communication device k.

At 804, the network entity 100 transmits the CRS pilots of subset $\mathcal{R}_n$ using the $L_n$-parametrized antenna aggregation ∀n∈{1, ..., $N_c$}.

At 805, the network entity 100 receives feedback from all the receivers corresponding to their CSI on all the subsets $\mathcal{R}_n$ At 806, the network entity 100 determines a mapping according to k∈{1, ..., K} ↦ $L_{n_k}$ ∈{$L_1$, ..., $L_{N_c}$} that assigns to each wireless communication device k a value $L_{n_k}$ of the Kronecker product tradeoff parameter.

At 807, the network entity 100 signals the value of $n_k$ (or equivalently $L_{n_k}$) to receiver k∀k∈{1, ..., K}.

Figure 9:
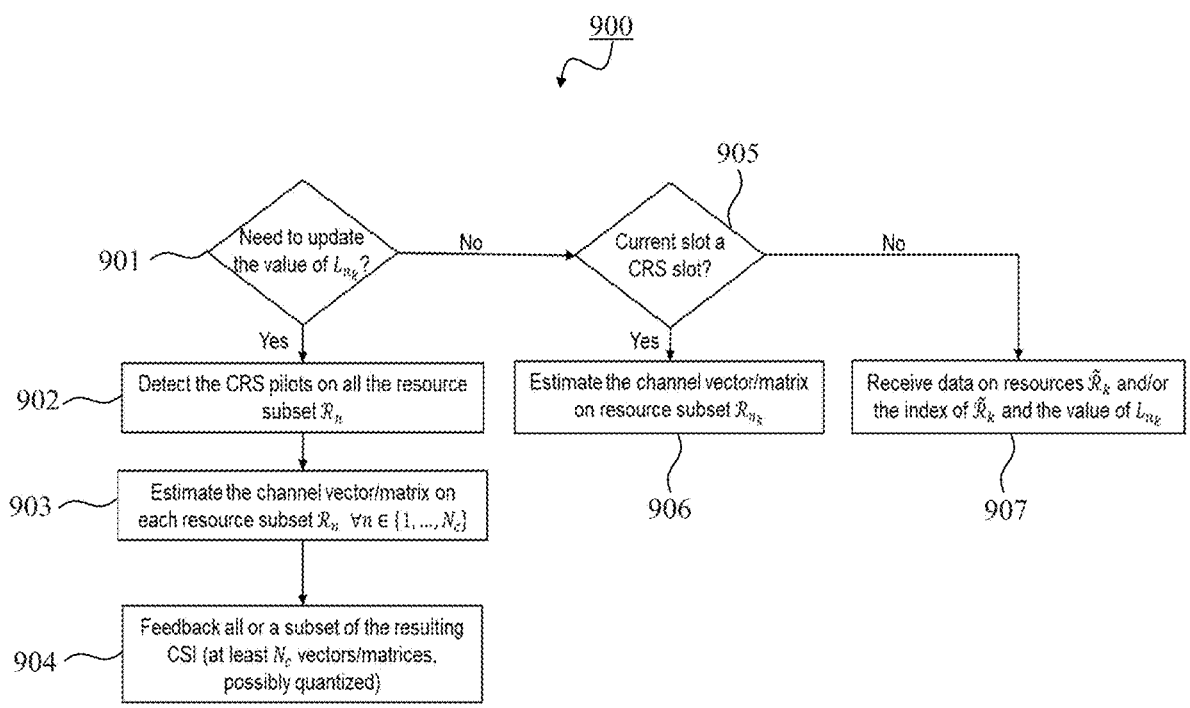
FIG. 9 is a flow diagram of pilot and data reception of the adaptive Kronecker product MIMO with CRS antenna aggregation at the wireless communication device during one-step CRS cycle.

Reference is made to FIG. 9 which is a flow diagram 900 of pilot and data reception of the adaptive Kronecker product MIMO with CRS antenna aggregation at the wireless communication device during one-step CRS cycle.

At 901, the wireless communication device 200 determines whether it is needed to update the value of $L_{n_k}$ or not.

Moreover, when it is determined "Yes", the wireless communication device 200 goes to step 902, however, when it is determined "No", the wireless communication device 200 goes to step 905.

At 902, the wireless communication device 200 detects the CRS pilots on all the resource subset $\mathcal{R}_n$.

At 903, the wireless communication device 200 estimates the channel vector/matrix on each resource subset $\mathcal{R}_n$ ∀n∈{1, ..., $N_c$}.

At 904, the wireless communication device 200 feedbacks all or a subset of the resulting CSI (for example, at least $N_c$ vectors/matrices, possibly quantized).

At 905, the wireless communication device 200 determines whether the current slot is a CRS slot or not. Moreover, when it is determined "Yes", the wireless communication device 200 goes to step 906, however, when it is determined "No", the wireless communication device 200 goes to step 907.

At 906, the wireless communication device 200 estimates the channel vector/matrix on resource subset $\mathcal{R}_{n_k}$.

At 907, the wireless communication device 200 receives data on resources subset $\tilde{\mathcal{R}}_k$ and/or the index of $\tilde{\mathcal{R}}_k$ and the value of $L_{n_k}$.

In some embodiments, a codebook and/or a non-codebook adaptive Kronecker product scheme may be provided with a two-step CRS antenna aggregation.

For example, the proposed CRS antenna aggregation may be integrated with a two-step CRS transmission that comprises the following. A first (less frequent large-overhead) transmission step: during this step the user terminals report their estimated CSI corresponding to all of the CSR ports (the ports corresponding to all of the possible values of the antenna aggregation parameter L). One of the outcomes of this step is to determine the best antenna aggregation value L for each user terminal (assuming that this value varies more slowly than the wireless channel coefficients). A second (more frequent light-overhead) transmission step: during this step the user terminals feedback their estimated CSI corresponding to only one value of the antenna aggregation parameter L (the value determined after the first step).

Note that, the overhead associated with this pilot scheme may be smaller than the overhead associated with the previous (one-step CRS) embodiment. The flow diagram of the steps needed to be performed at the network entity 100 are shown in FIG. 10.

Figure 10:
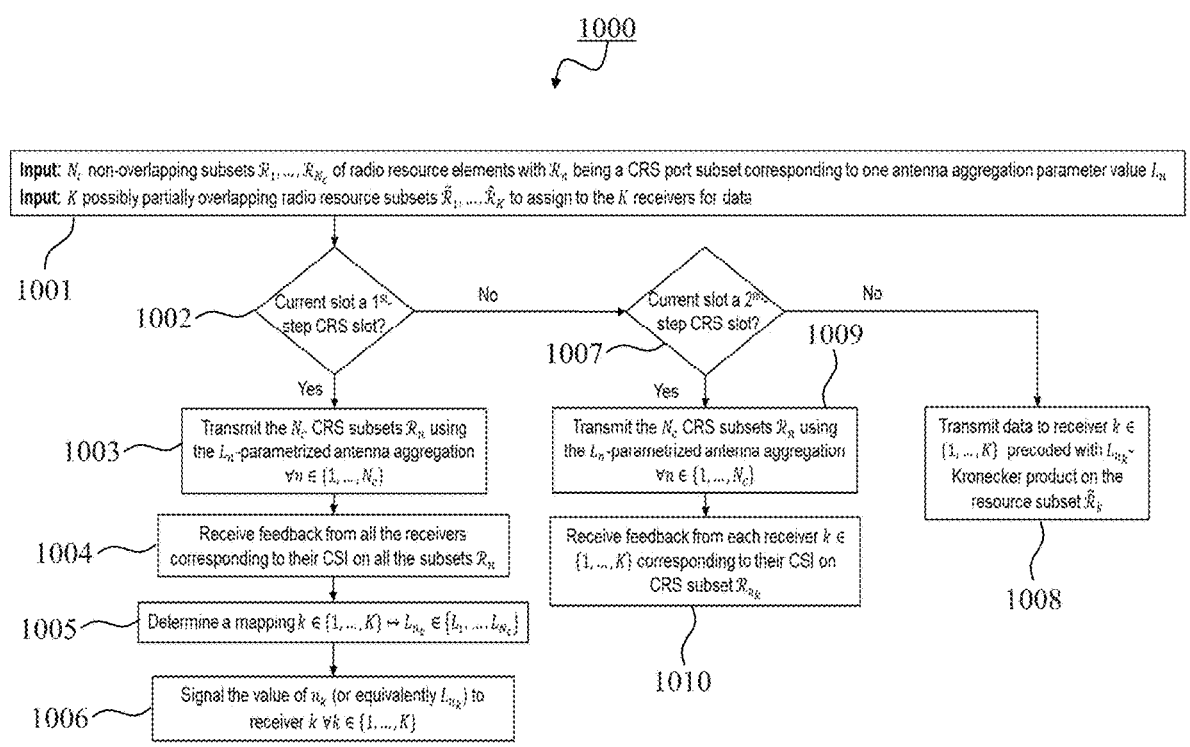
FIG. 10 is a flow diagram of adaptive Kronecker product MIMO transmission with CRS antenna aggregation at the network entity during two-step CRS cycle.

Reference is made to FIG. 10 which is a flow diagram 1000 of adaptive Kronecker product MIMO transmission with CRS antenna aggregation at the network entity during two-step CRS cycle.

At 1001, the network entity 100 obtains the input data.

For example, the input data may be:

$N_c$ non-overlapping subsets $\mathcal{R}_1, \ldots, \mathcal{R}_{N_c}$ of radio resource elements with $\mathcal{R}_n$ being a CRS port subset corresponding to one antenna aggregation parameter value $L_n$ K possibly partially overlapping radio resource subsets $\tilde{\mathcal{R}}_1, \ldots, \tilde{\mathcal{R}}_K$ to assign to the K receivers for data At 1002, the network entity 100 determines if the current slot a $1^{st}$-step CRS slot? Moreover, when it is determined "Yes", the network entity 100 goes to step 1003, however, when it is determined "No", the network entity 100 goes to step 1007.

At 1003, the network entity 100 transmits the $N_c$ CRS subsets $\mathcal{R}_n$ using the $L_n$-parametrized antenna aggregation ∀n∈{1, ..., $N_c$}.

At 1004, the network entity 100 receives feedback from all the receivers corresponding to their CSI on all the subsets $\mathcal{R}_n$.

At 1005, the network entity 100 determine a mapping of $k \in \{1, \ldots, K\}$ to $L_{n_k} \in \{L_1, \ldots, L_{N_c}\}$.

At 1006, the network entity 100 signals the value of $n_k$ (or equivalently $L_{n_k}$) to the receiver k $\forall k \in \{1, \ldots, K\}$.

At 1007, the network entity 100 determines whether the current slot is a 2nd-step CRS slot or not. Moreover, when it is determined "Yes", the network entity 100 goes to step 1009, however, when it is determined "No", the network entity 100 goes to step 1008.

At 1008, the network entity 100 transmits data to the receiver $k \in \{1, \ldots, K\}$ precoded with $L_{n_k}$-Kronecker product on the resource subset $\tilde{\mathcal{R}}_k$.

At 1009, the network entity 100 transmits the $N_c$ CRS subsets $\mathcal{R}_n$ using the $L_n$-parametrized antenna aggregation $\forall n \in \{1, \ldots, N_c\}$.

At 1010, the network entity 100 receives feedback from each receiver $k \in \{1, \ldots, K\}$ corresponding to their CSI on CRS subset $\mathcal{R}_{n_k}$.

Figure 11:
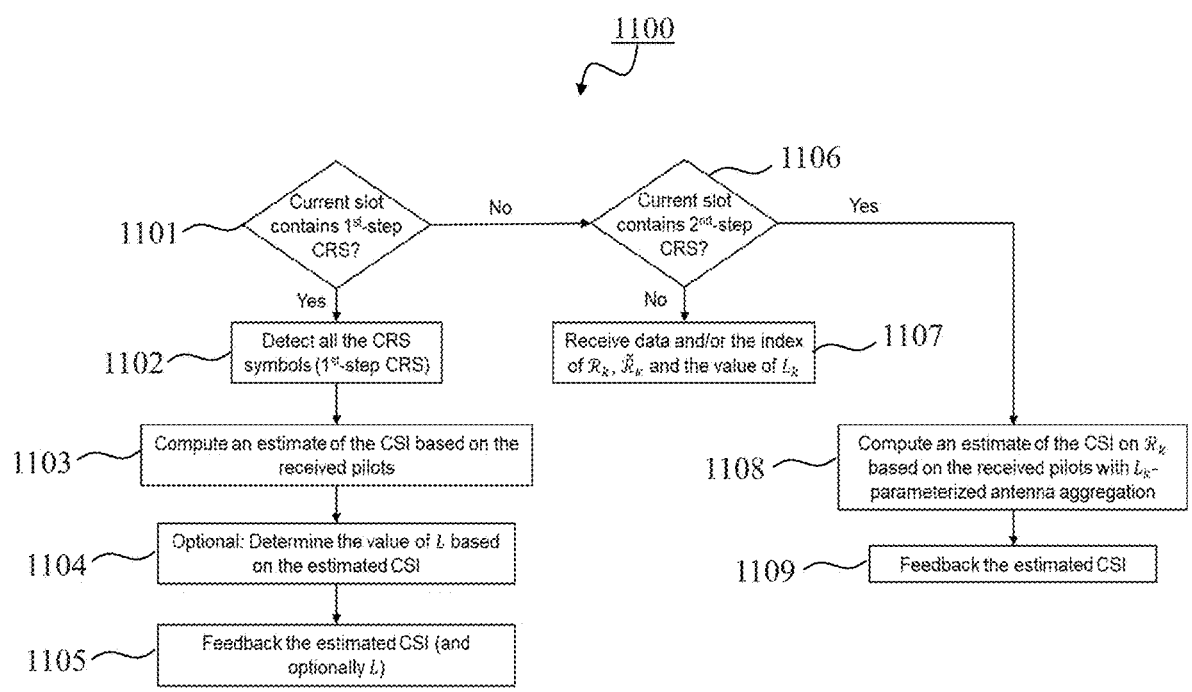
FIG. 11 is a flow diagram of pilot and data reception of adaptive Kronecker product MIMO with CRS antenna aggregation at the wireless communication device during two-step CRS cycle.

Reference is made to FIG. 11 which is a flow diagram 1100 of pilot and data reception of adaptive Kronecker product MIMO with CRS antenna aggregation at the wireless communication device during two-step CRS cycle.

At 1101, the wireless communication device 200 determines whether the current slot contains $1^{st}$-step CRS or not. Moreover, when it is determined "Yes", the wireless communication device 200 goes to step 1102, however, when it is determined "No", the wireless communication device 200 goes to step 1106.

At 1102, the wireless communication device 200 detects all the CRS symbols ($1^{st}$-step CRS).

At 1103, the wireless communication device 200 computes an estimate of the CSI based on the received pilots.

At 1104, the wireless communication device 200 (optionally) determines the value of L based on the estimated CSI.

At 1105, the wireless communication device 200 feedbacks the estimated CSI (and optionally L).

At 1106, the wireless communication device 200 determines if the current slot contains $2^{nd}$-step CRS? Moreover, when it is determined "Yes", the wireless communication device 200 goes to step 1108, however, when it is determined "No", the wireless communication device 200 goes to step 1107.

At 1107, the wireless communication device 200 receives data and/or the index of $\mathcal{R}_k$, $\tilde{\mathcal{R}}_k$ and the value of $L_k$.

At 1108, the wireless communication device 200 computes an estimate of the CSI on $\mathcal{R}_k$ based on the received pilots with $L_k$-parameterized antenna aggregation.

At 1109, the wireless communication device 200 feedbacks the estimated CSI.

Note that, some signaling may be needed to inform the wireless communication device (user terminals) of the particular subset of CRS ports for which the feedback is needed. In FIG. 7 and FIG. 8, the subset signaled to user k is referred to as $\mathcal{R}_k$ and it corresponds to one value $L_k$ of the antenna aggregation parameter. This signaling may be particularly needed, in embodiments where this value of $L_k$ is determined at the network entity 100 (base station/access point) side.

Figure 12:
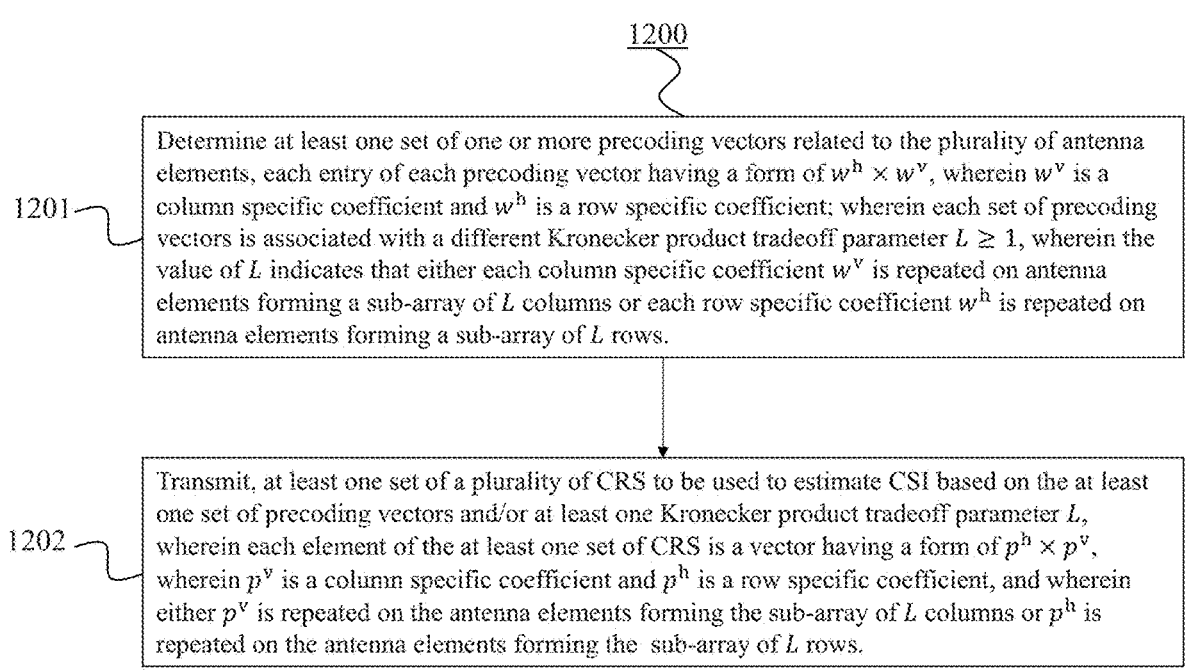
FIG. 12 is a flowchart of a method for a network entity comprising a plurality of antenna elements arranged in a 2D array, according to an embodiment of the present invention.

Reference is made to FIG. 12 which is a flowchart of a method 1200 for a network entity comprising a plurality of antenna elements arranged in a 2D array, according to an embodiment of the present invention. The method 1200 may be carried out by the network entity 100, as it described above.

The method 1200 comprises a step 1201 of determining at least one set of one or more precoding vectors 102, 103 related to the plurality of antenna elements 101, each entry of each precoding vector having a form of $w^h \times w^v$, wherein $w^v$ is a column specific coefficient and $w^h$ is a row specific coefficient; wherein each set of precoding vectors 102, 103 is associated with a different Kronecker product tradeoff parameter $L \geq 1$, wherein the value of L indicates that either each column specific coefficient $w^v$ is repeated on antenna elements forming a sub-array of L columns or each row specific coefficient $w^h$ is repeated on antenna elements forming a sub-array of L rows.

The method 1200 further comprises a step 1202 of transmitting, at least one set of a plurality of Cell Specific Reference Signals (CRS) 104, to be used to estimate channel state information, CSI, based on the at least one set of precoding vectors 102, 103 and/or at least one Kronecker product tradeoff parameter L, wherein each element of the at least one set of CRS 104 is a vector having a form of $p^h \times p^v$, wherein $p^v$ is a column specific coefficient and $p^h$ is a row specific coefficient, and wherein either $p^v$ is repeated on antenna elements forming the sub-array of L columns or $p^h$ is repeated on the antenna elements forming the sub-array of L rows.

Figure 13:
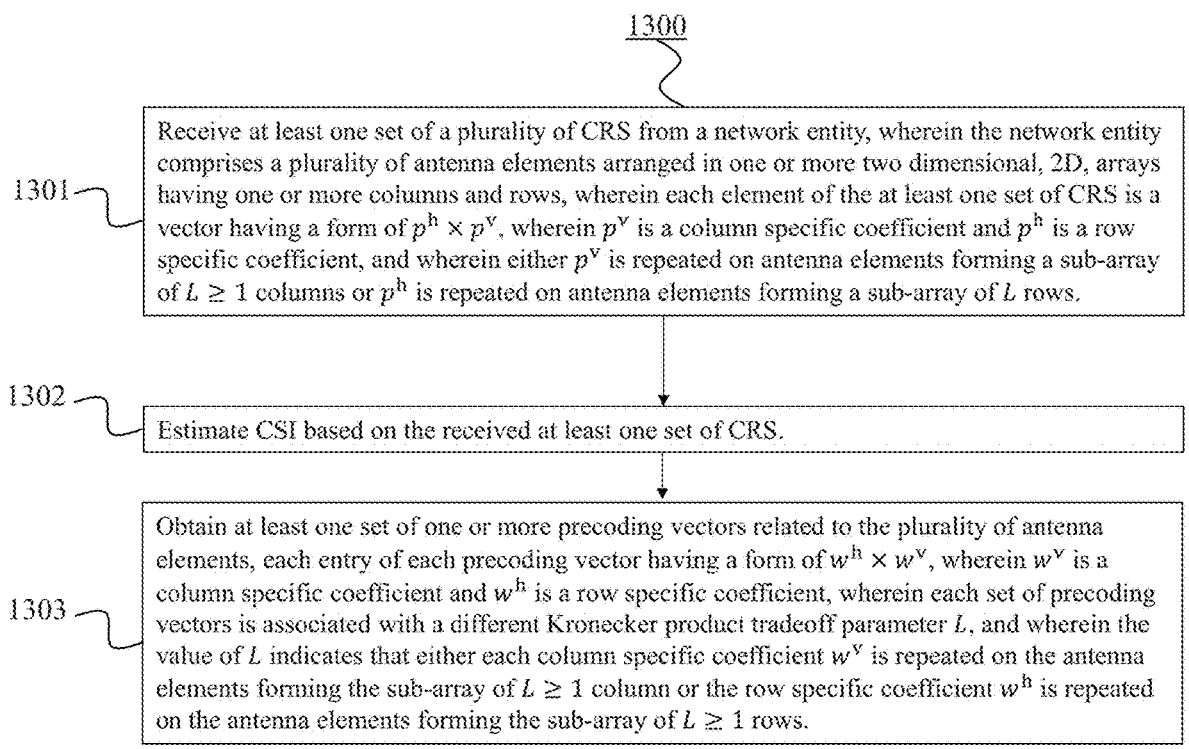
FIG. 13 is a flowchart of a method for a wireless communication device, according to an embodiment of the present invention.
Figure 14:
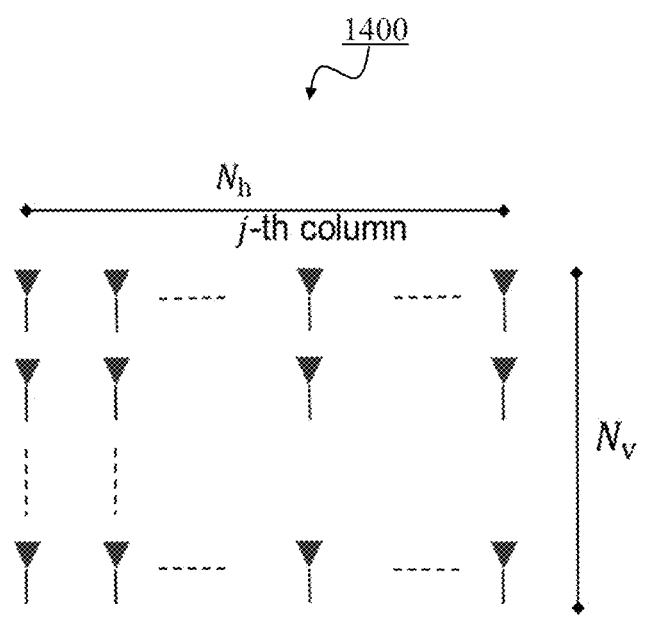
FIG. 14 schematically illustrates a conventional 2D antenna array configuration.
Figure 15:
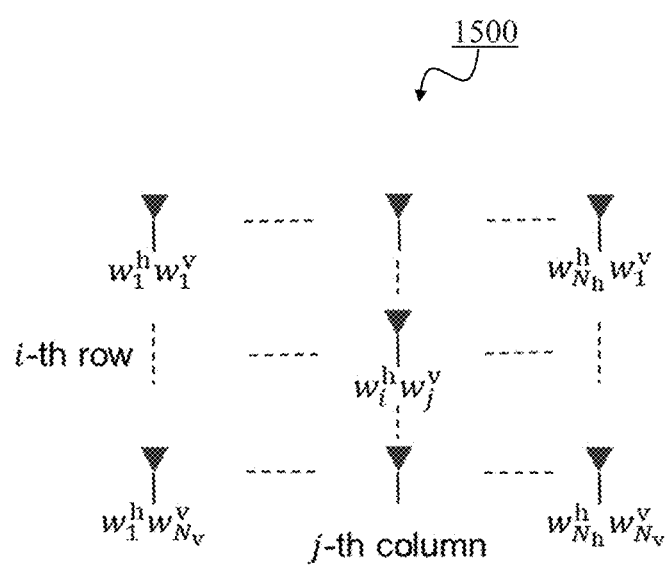
FIG. 15 schematically illustrates a conventional MIMO precoder coefficients that satisfy the Kronecker product property.

FIG. 13 shows a flowchart of a method 1300 for a wireless communication device, according to an embodiment of the present invention. The method 1300 may be carried out by the wireless communication device 200, as it described above.

The method 1300 comprises a step 1301 of receiving at least one set of a plurality of Cell Specific Reference Signals (CRS) 104 from a network entity 100, wherein the network entity 100 comprises a plurality of antenna elements 101 arranged in one or more two dimensional, 2D, arrays having one or more columns and rows, wherein each element of the at least one set of CRS 104 is a vector having a form of $p^h \times p^v$, wherein $p^v$ is a column specific coefficient and $p^h$ is a row specific coefficient, and wherein either $p^v$ is repeated on antenna elements forming a sub-array of $L \geq 1$ columns or $p^h$ is repeated on antenna elements forming a sub-array of L rows.

The method 1300 further comprises a step 1302 of estimating Channel State Information (CSI) 201 based on the received at least one set of CRS 104.

The method 1300 further comprises a step 1303 of obtaining at least one set of one or more precoding vectors 102, 103 related to the plurality of antenna elements 101, each entry of each precoding vector 102, 103 having a form of $w^h \times w^v$, wherein $w^v$ is a column specific coefficient and $w^h$ is a row specific coefficient, wherein each set of precoding vectors 102, 103 is associated with a different Kronecker product tradeoff parameter L, and wherein the value of L indicates that either each column specific coefficient $w^v$ is repeated on the antenna elements forming the sub-array of $L \geq 1$ column or the row specific coefficient $w^h$ is repeated on the antenna elements forming the sub-array of $L \geq 1$ rows.

The present invention has been described in conjunction with various embodiments as examples as well as implementations. However, other variations can be understood and effected by those persons skilled in the art and practicing the claimed invention, from the studies of the drawings, this disclosure and the independent claims. In the claims as well as in the description the word "comprising" does not exclude other elements or steps and the indefinite article "a" or "an"

does not exclude a plurality. A single element or other unit may fulfill the functions of several entities or items recited in the claims. The mere fact that certain measures are recited in the mutual different dependent claims does not indicate that a combination of these measures cannot be used in an advantageous implementation.

What is claimed is:

1. A network entity, comprising:
   a plurality of antenna elements arranged in one or more two-dimensional (2D) arrays having one or more columns and rows;
   at least one processor; and
   a non-transitory computer-readable storage medium storing at least one program that is executable by the at least one processor, the at least one program comprising instructions to:
   determine at least one set of one or more precoding vectors related to the plurality of antenna elements, each of the one or more precoding vectors comprising one or more entries, each entry of each precoding vector having a form of $w^h \times w^v$, wherein $w^v$ is a column-specific coefficient and $w^h$ is a row-specific coefficient, wherein each set of one or more precoding vectors is associated with a different Kronecker product tradeoff parameter $L \geq 1$, and wherein each value of L indicates that either each column-specific coefficient $w^v$ is repeated on antenna elements forming a sub-array of L columns or each row-specific coefficient $w^h$ is repeated on antenna elements forming a sub-array of L rows; and
   transmit at least one set of a plurality of Cell-Specific Reference Signals (CRSs) to be used as channel state information (CSI) pilots to estimate CSI based on the at least one set of one or more precoding vectors or at least one Kronecker product tradeoff parameter L, wherein each set of the plurality of CRSs comprises one or more elements, each element of the at least one set of the plurality of CRSs is a vector having a form of $p^h \times p^v$, wherein $p^v$ is a column-specific coefficient and $p^h$ is a row-specific coefficient, and wherein either $p^v$ is repeated on the antenna elements forming the sub-array of L columns or $p^h$ is repeated on the antenna elements forming the sub-array of L rows.

2. The network entity according to claim 1, wherein the at least one program further comprises instructions to:
   receive a feedback message from a wireless communication device indicating a determined Kronecker product tradeoff parameter L, or a set of precoding vectors or precoding vector indices from a predefined set of precoding vectors corresponding to a value of the determined Kronecker product tradeoff parameter L.

3. The network entity according to claim 2, wherein the at least one program further comprises instructions to:
   perform a mapping of the received determined Kronecker product tradeoff parameter L to the at least one set of one or more precoding vectors to obtain a mapping result; and
   determine the set of precoding vectors based on the mapping result.

4. The network entity according to claim 3, wherein the at least one program further comprises instructions to:
   update the at least one set of the plurality of CRSs to be used as CSI pilots based on the received determined Kronecker product tradeoff parameter L to obtain an updated at least one set of the plurality of CRSs; and
   transmit the updated at least one set of the plurality of CRSs to one or more wireless communication devices by mapping entries of each element of the at least one set of the plurality of CRSs to corresponding antenna elements of the one or more 2D arrays of the plurality of antenna elements, or by separately sending vertical and horizontal components of the mapping entries of each element of the at least one set of the plurality of CRSs using L-order antenna aggregation, wherein each subarray of L columns or each subarray of L rows is uniquely excited using one determined value of the vertical component $p^v$ or of the horizontal component $p^h$.

5. The network entity according to claim 1, wherein the at least one program further comprises instructions to:
   transmit a control message to a wireless communication device, the control message indicating instructions for determining a Kronecker product tradeoff parameter L specified for the wireless communication device.

6. The network entity according to claim 5, wherein the at least one program further comprises instructions to:
   adjust, for transmission to a wireless communication device, the Kronecker product tradeoff parameter L specified for the wireless communication device based on CSI feedback received from the wireless communication device.

7. The network entity according to claim 1, wherein the at least one program further comprises instructions to:
   determine, for a first value of a Kronecker tradeoff parameter L or a plurality of precoding vectors corresponding to the first value, the column-specific coefficients $w^v$ or the row-specific coefficients $w^h$, wherein the determining of the column-specific coefficients $w^v$ is performed independently or semi-independently of the row-specific coefficients $w^h$, the determining of the row-specific coefficients $w^h$ is performed independently or semi-independently of the column-specific coefficients $w^v$, and wherein the row-specific coefficients $w^h$ and the column-specific coefficients $w^v$ are determined based on two separate performance criteria.

8. The network entity according to claim 7, wherein the at least one program further comprises instructions to:
   determine a first Kronecker product tradeoff parameter L based on the two separate performance criteria or a tradeoff between the two separate performance criteria.

9. The network entity according to claim 8, wherein the at least one program further comprises instructions to:
   update the first Kronecker tradeoff parameter L and transmit a set of CRS required for updating the first Kronecker tradeoff parameter L and for CSI estimation, based on a one-step CRS scheme, wherein the first Kronecker product tradeoff parameter L is updated during each CRS cycle; or
   update the first Kronecker tradeoff parameter L and transmit the set of CRS required for updating the first Kronecker tradeoff parameter L and for CSI estimation, based on a two-step CRS scheme, wherein the first Kronecker product tradeoff parameter L corresponds to a wireless communication device and is updated only once during a period of CRS cycles comprising at least one cycle.

10. The network entity according to claim 1, wherein the at least one program further comprises instructions to:
    store, in a Look-Up Table, one or more of the one or more precoding vectors or the at least one Kronecker product tradeoff parameter L.

11. A method, comprising:
  determining, by a network entity, at least one set of one or more precoding vectors related to a plurality of antenna elements, the network entity comprising the plurality of antenna elements, the plurality of antenna elements being arranged in one or more two-dimensional (2D) arrays, each of the one or more precoding vectors comprising one or more entries, and each entry of each precoding vector having a form of $w^h \times w^v$, wherein $w^v$ is a column-specific coefficient and $w^h$ is a row-specific coefficient, wherein each set of one or more precoding vectors is associated with a different Kronecker product tradeoff parameter $L \geq 1$, and wherein each value of L indicates that either each column-specific coefficient $w^v$ is repeated on antenna elements forming a sub-array of L columns or each row-specific coefficient $w^h$ is repeated on antenna elements forming a sub-array of L rows; and
  transmitting, by the network entity, at least one set of a plurality of Cell-Specific Reference Signals (CRSs) to be used as channel state information (CSI) pilots to estimate CSI based on the at least one set of one or more precoding vectors or at least one Kronecker product tradeoff parameter L, wherein each set of the plurality of CRSs comprises one or more elements, each element of the at least one set of the plurality of CRSs is a vector having a form of $p^h \times p^v$, wherein $p^v$ is a column-specific coefficient and $p^h$ is a row-specific coefficient, and wherein either $p^v$ is repeated on the antenna elements forming the sub-array of L columns or $p^h$ is repeated on the antenna elements forming the sub-array of L rows.

12. A wireless communication device, comprising:
  at least one processor; and
  a non-transitory computer-readable storage medium storing at least one program that is executable by the at least one processor, the at least one program comprising instructions to:
    receive at least one set of a plurality of Cell-Specific Reference Signals (CRSs) from a network entity, wherein the network entity comprises a plurality of antenna elements arranged in one or more two-dimensional (2D) arrays having one or more columns and rows, wherein each set of the at least one set of the plurality of CRSs comprises one or more elements, each element of the at least one set of the plurality of CRSs is a vector having a form of $p^h \times p^v$, wherein $p^v$ is a column-specific coefficient and $p^h$ is a row-specific coefficient, and wherein either $p^v$ is repeated on antenna elements forming a sub-array of $L \geq 1$ columns or $p^h$ is repeated on antenna elements forming a sub-array of L rows;
    estimate Channel State Information (CSI) based on the received at least one set of the plurality of CRSs; and
    obtain at least one set of one or more precoding vectors related to the plurality of antenna elements, each of the one or more precoding vectors comprising one or more entries, each entry of each precoding vector having a form of $w^h \times w^v$, wherein $w^v$ is a column-specific coefficient and $w^h$ is a row-specific coefficient, wherein each set of one or more precoding vectors is associated with a different Kronecker product tradeoff parameter L, and wherein a value of L indicates that either each column-specific coefficient $w^v$ is repeated on the antenna elements forming the sub-array of $L \geq 1$ columns or the row-specific coefficient $w^h$ is repeated on the antenna elements forming the sub-array of $L \geq 1$ rows.

13. The wireless communication device according to claim 12, wherein the at least one program further comprises instructions to:
  determine at least one Kronecker product tradeoff parameter L or a set of one or more precoding vectors or precoding vector indices from a predefined set of precoding vectors corresponding to the determined Kronecker product tradeoff parameter L, based on the estimated CSI.

14. The wireless communication device according to claim 13, wherein the at least one program further comprises instructions to:
  send a feedback message to the network entity indicating the determined at least one Kronecker product tradeoff parameter L or the set of one or more precoding vectors or the precoding vector indices.

15. The wireless communication device according to claim 14, wherein the at least one program further comprises instructions to:
  receive an updated set of CRSs from the network entity, based on the determined at least one Kronecker product tradeoff parameter L or the set of one or more precoding vectors or the precoding vector indices.

16. The wireless communication device according to claim 12, wherein the at least one program further comprises instructions to:
  receive a control message from the network entity, the control message indicating instructions for determining a Kronecker product tradeoff parameter L specified for the wireless communication device.

17. The wireless communication device according to claim 16, wherein the at least one program further comprises instructions to:
  send an adjusted Kronecker product tradeoff parameter L or CSI feedback required to adjust the determined Kronecker product tradeoff parameter L specified for the wireless communication device to the network entity based on a one-step CRS scheme, wherein the determined Kronecker product tradeoff parameter L is updated and sent during each CRS cycle; or
  send an adjusted Kronecker product tradeoff parameter L or CSI feedback required to adjust the determined Kronecker product tradeoff parameter L specified for the wireless communication device to the network entity based on a two-step CRS scheme, wherein the determined Kronecker product tradeoff parameter L specified for the wireless communication device is updated and sent only once during a period of CRS cycles comprising at least one cycle.

18. The wireless communication device according to claim 12, wherein the at least one program further comprises instructions to:
  receive a Look-Up Table (LUT) or an index pointing to a LUT within a plurality of predefined LUTs from the network entity, the LUT or the index indicating the one or more precoding vectors or at least one Kronecker product tradeoff parameter L.

19. A method, comprising:
  receiving, by a wireless communication device, at least one set of a plurality of Cell-Specific Reference Signals (CRSs) from a network entity, wherein the network entity comprises a plurality of antenna elements arranged in one or more two-dimensional (2D) arrays having one or more columns and rows, wherein each set of the plurality of CRSs comprises one or more elements, each element of the at least one set of the plurality of CRSs is a vector having a form of $p^h \times p^v$, wherein $p^v$ is a column-specific coefficient and $p^h$ is a row-specific coefficient, and wherein either $p^v$ is repeated on antenna elements forming a sub-array of $L \geq 1$ columns or $p^h$ is repeated on antenna elements forming a sub-array of L rows;

estimating Channel State Information (CSI) based on the received at least one set of the plurality of CRSs; and obtaining at least one set of one or more precoding vectors related to the plurality of antenna elements, each entry of each precoding vector having a form of $w^h \times w^v$, wherein $w^v$ is a column-specific coefficient and $w^h$ is a row-specific coefficient, wherein each set of one or more precoding vectors is associated with a different Kronecker product tradeoff parameter L, and wherein a value of L indicates that either each column-specific coefficient $w^v$ is repeated on the antenna elements forming the sub-array of $L \geq 1$ column or the-row specific coefficient $w^h$ is repeated on the antenna elements forming the sub-array of $L \geq 1$ rows.

\* \* \* \* \*